(12) United States Patent
Furusawa et al.

(10) Patent No.: US 8,789,106 B2
(45) Date of Patent: Jul. 22, 2014

(54) CHANNEL CONTRACT PROPOSING APPARATUS, METHOD, PROGRAM AND INTEGRATED CIRCUIT

(75) Inventors: Seiji Furusawa, Osaka (JP); Noriko Sugimoto, Hyogo (JP); Soichiro Fujioka, Osaka (JP)

(73) Assignee: Panasonic Corporation, Osaka (JP)

( * ) Notice: Subject to any disclaimer, the term of this patent is extended or adjusted under 35 U.S.C. 154(b) by 1351 days.

(21) Appl. No.: 11/663,559

(22) PCT Filed: Sep. 29, 2005

(86) PCT No.: PCT/JP2005/018009
§ 371 (c)(1),
(2), (4) Date: Mar. 26, 2008

(87) PCT Pub. No.: WO2006/038529
PCT Pub. Date: Apr. 13, 2006

(65) Prior Publication Data
US 2008/0172696 A1    Jul. 17, 2008

(30) Foreign Application Priority Data
Oct. 1, 2004  (JP) ................. 2004-290354

(51) Int. Cl.
*G06F 3/00* (2006.01)
*G06F 13/00* (2006.01)
*H04N 5/445* (2011.01)

(52) U.S. Cl.
USPC ............................................. 725/46

(58) Field of Classification Search
CPC .............. H04N 21/2543; H04N 21/26283; H04N 21/4221; H04N 21/462; H04N 21/23109; H04N 21/8402; H04N 21/42209; H04N 21/42216; H04N 21/4314; H04N 21/4332; H04N 21/482
USPC ................. 725/22, 32, 34, 39, 44, 46, 47
See application file for complete search history.

(56) References Cited

U.S. PATENT DOCUMENTS 5,592,551 A * 1/1997 Lett et al. ................. 380/211
5,682,195 A   10/1997 Hendricks et al.
(Continued)

FOREIGN PATENT DOCUMENTS

CN    1096151    12/1994
CN    1475078    2/2004
(Continued)

*Primary Examiner* — Nasser Goodarzi
*Assistant Examiner* — An Nguyen
(74) *Attorney, Agent, or Firm* — Wenderoth, Lind & Ponack, L.L.P.

(57) ABSTRACT

A receiving unit 200 receives, from broadcast stations (10, 11), EPG information related to all the programs to be broadcast on a plurality of channels. A program recommendation unit (300) extracts, from the programs indicated in the EPG information, a recommended program, which is estimated to meet the user's preferences, in accordance with history of program recording or program viewing by the user. A subscription suggestion unit (400) counts the broadcast frequency for each of the channels of recommended programs and for each day, and then compares the counting result with a threshold value, thereby suggesting to the user, via a display unit (20), that he or she makes or cancels any one of subscriptions to the channels in accordance with the broadcast frequency of recommended programs.

13 Claims, 21 Drawing Sheets

(56) References Cited

U.S. PATENT DOCUMENTS

| | | | |
|---|---|---|---|
| 6,236,980 B1 * | 5/2001 | Reese | 705/36 R |
| 6,704,931 B1 | 3/2004 | Schaffer et al. | |
| 7,096,486 B1 | 8/2006 | Ukai et al. | |
| 2002/0075320 A1 * | 6/2002 | Kurapati | 345/811 |
| 2002/0157096 A1 | 10/2002 | Hane et al. | |
| 2003/0009757 A1 * | 1/2003 | Kikinis | 725/39 |
| 2003/0088871 A1 * | 5/2003 | Kimura | 725/46 |
| 2003/0117445 A1 * | 6/2003 | Hendricks et al. | 345/810 |
| 2003/0131355 A1 * | 7/2003 | Berenson et al. | 725/46 |
| 2003/0237093 A1 * | 12/2003 | Marsh | 725/46 |
| 2004/0073918 A1 * | 4/2004 | Ferman et al. | 725/34 |
| 2004/0083490 A1 | 4/2004 | Hane | |
| 2004/0220858 A1 * | 11/2004 | Maggio | 705/14 |
| 2004/0221308 A1 * | 11/2004 | Cuttner et al. | 725/46 |
| 2006/0129547 A1 * | 6/2006 | Yamamoto et al. | 707/5 |
| 2006/0248091 A1 | 11/2006 | Yamamoto et al. | |
| 2006/0271958 A1 | 11/2006 | Ukai et al. | |
| 2007/0076872 A1 * | 4/2007 | Juneau | 380/202 |

FOREIGN PATENT DOCUMENTS

| | | |
|---|---|---|
| JP | 9-261609 | 10/1997 |
| JP | 10-257405 | 9/1998 |
| JP | 2000-13708 | 1/2000 |
| JP | 2000-152103 | 5/2000 |
| JP | 2001-157191 | 6/2001 |
| JP | 2002-142160 | 5/2002 |
| JP | 2002-320159 | 10/2002 |
| JP | 2003-134490 | 5/2003 |
| JP | 2003-526290 | 9/2003 |
| JP | 2004-194107 | 1/2004 |
| JP | 2004-64199 | 2/2004 |
| JP | 2004-194095 | 7/2004 |
| JP | 2004-328244 | 11/2004 |
| WO | 03/065727 | 8/2003 |

* cited by examiner

FIG. 3

| CATEGORY / KEYWORD | TRAVEL | GOURMET | COOKING | MUSIC | MOVIE | DRAMA | ...... |
|---|---|---|---|---|---|---|---|
| ACCOMMODATION | 1.00 | 0.00 | 0.00 | 0.00 | 0.00 | 0.00 | |
| JOURNEY | 1.00 | 0.00 | 0.00 | 0.00 | 0.00 | 0.00 | |
| VACATION | 0.80 | 0.20 | 0.00 | 0.00 | 0.00 | 0.00 | |
| TRAVEL | 1.00 | 0.00 | 0.00 | 0.00 | 0.00 | 0.00 | |
| MENU | 0.00 | 0.00 | 1.00 | 0.00 | 0.00 | 0.00 | |
| FRANCE | 0.50 | 0.40 | 0.10 | 0.00 | 0.00 | 0.00 | |
| SOUND | 0.00 | 0.00 | 0.00 | 1.00 | 0.00 | 0.00 | |
| MUSIC | 0.00 | 0.00 | 0.00 | 1.00 | 0.00 | 0.00 | |
| DRAMA | 0.00 | 0.00 | 0.00 | 0.00 | 0.00 | 1.00 | |
| MUSICAL | 0.00 | 0.00 | 0.00 | 0.60 | 0.30 | 0.10 | |
| ...... | | | | | | | |

FIG. 4

| CH | BROAD-CAST DATE | START TIME | PROGRAM NAME | PROGRAM CATEGORY (EVALUATION V) | PRE-FERRED PROGRAM | RECOM-MENDED PROGRAM |
|---|---|---|---|---|---|---|
| 1 | 3/3 | 22:00 | DRAMA "TOWER IN THE SKY" | DRAMA(1.0) | | |
| 2 | 3/5 | 21:00 | GOURMET NAVIGATION | COOKING(0.8), TRAVEL(0.2) | | |
| 1 | 3/8 | 20:00 | JOURNEY THROUGH FRANCE | TRAVEL(0.75), GOURMET(0.2), COOKING(0.05) | | |
| 1 | 3/9 | 16:30 | INTERNATIONAL MUSIC 2004 | MUSIC(1.0) | YES | |
| 1 | 3/9 | 21:00 | SOUND TRAVEL | MUSIC(0.5), TRAVEL(0.5) | YES | |
| ... | ... | ... | ... | ... | ... | ... |
| 101 | 3/11 | 20:00 | MOVIE "ABCDE" MUSICAL | MOVIE(0.5), MUSIC(0.5) | | YES |
| 2 | 3/12 | 20:00 | MUSICAL "FIRE GIRL" | MUSIC(0.6), MOVIE(0.3), DRAMA(0.1) | | YES |
| 201 | 3/13 | 20:00 | BACKSTREET GIRLS MUSIC HITS | MUSIC(1.0) | | YES |
| 101 | 3/13 | 20:00 | MOVIE MUSIC "VWXYZ" | MOVIE(0.5), MUSIC(0.5) | | YES |
| 301 | 3/13 | 19:30 | ENJOYING A VACATION IN FRANCE | TRAVEL(0.65), GOURMET(0.3), COOKING(0.05) | | |
| ... | ... | ... | ... | ... | ... | ... |

40

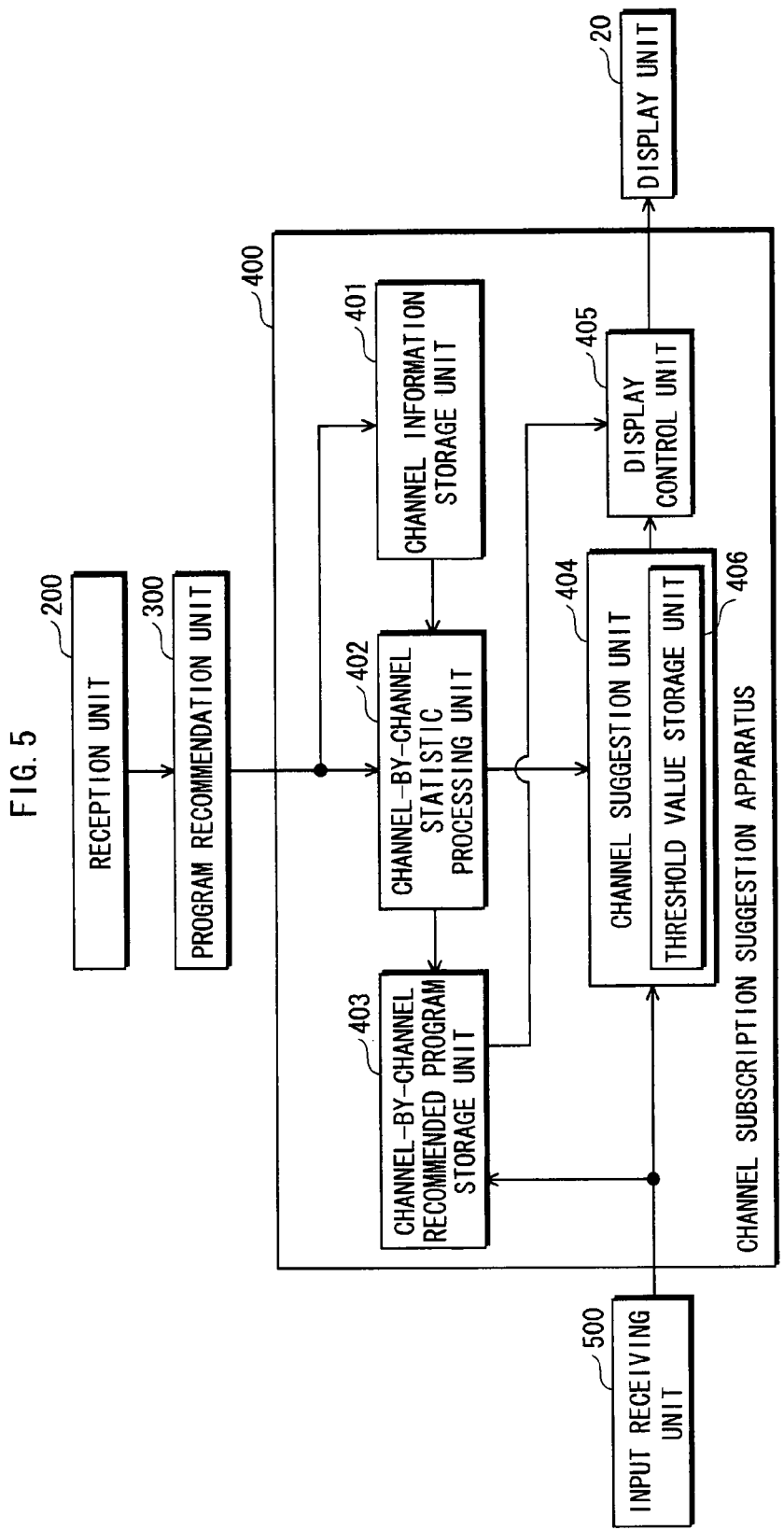

FIG. 6

| | CHANNELS | SUBSCRIPTION STATE | CHARGE |
|---|---|---|---|
| FREE CHANNELS | 1 | — | 0 YEN |
| | 2 | — | 0 YEN |
| | ⋮ | | |
| PAY CHANNELS | 101 | SUBSCRIBED | 500 YEN/MONTH |
| | 102 | UNSUBSCRIBED | 200 YEN/MONTH |
| | 201 | UNSUBSCRIBED | 300 YEN/MONTH |
| | 202 | SUBSCRIBED | 300 YEN/MONTH |
| | 301 | SUBSCRIBED | 400 YEN/MONTH |
| | 302 | UNSUBSCRIBED | 400 YEN/MONTH |
| | ⋮ | | |

FIG. 7

| CH | BROADCAST DATE | START TIME | PROGRAM TITLE |
|---|---|---|---|
| 1 | | | |
| 2 | 3/12 | 20:00 | MUSICAL "FIRE GIRL" ... |
| 101 | 3/11<br>3/13 | 20:00<br>20:00 | MOVIE "ABCDE" MUSICAL<br>MOVIE MUSIC "VWXYZ" ... |
| 202 | | | |
| 301 | | | |
| 102 | 3/13<br>3/13<br>3/13 | 16:30<br>20:00<br>21:00 | LIVE COUNTDOWN MAX<br>BACKSTREET GIRLS MUSIC HITS<br>MUSIC WIND |
| 201 | | | |
| 302 | | | |

- CH 1, 2: FREE CHANNELS
- CH 101, 202, 301: SUBSCRIBED (PAY CHANNELS)
- CH 102, 201, 302: UNSUBSCRIBED (PAY CHANNELS)

FIG. 8

| CH | 3/11 | 3/12 | 3/13 | 3/14 | 3/15 | 3/16 | 3/17 |
|---|---|---|---|---|---|---|---|
| 1 | 2 | 3 | 1 | 2 | 2 | 3 | 2 |
| 2 | 3 | 2 | 1 | 1 | 3 | 2 | 2 |
| ... | | | | | | | |
| 101 | 3 | 3 | 2 | 1 | 4 | 2 | 2 |
| 202 | 2 | 2 | 3 | 2 | 2 | 2 | 3 |
| 301 | 1 | 1 | 0 | 1 | 1 | 1 | 0 |
| ... | | | | | | | |
| 102 | 1 | 0 | 0 | 1 | 0 | 0 | 0 |
| 201 | 3 | 2 | 3 | 4 | 3 | 3 | 2 |
| 302 | 0 | 0 | 1 | 0 | 0 | 0 | 0 |
| ... | | | | | | | |

FREE CHANNELS: rows 1, 2, ...
SUBSCRIBED (PAY CHANNELS): rows 101, 202, 301, ...
UNSUBSCRIBED (PAY CHANNELS): rows 102, 201, 302, ...

FIG. 9

| CH | 3/11 | 3/12 | 3/13 | 3/14 | 3/15 | 3/16 | 3/17 |
|---|---|---|---|---|---|---|---|
| 1 | 2 | 3 | | | | | |
| 2 | 3 | 2 | | | | | |
| ... | | | | | | | |
| 101 | 1 | 3 | 2 | 1 | 4 | 2 | 2 |
| 202 | 2 | 2 | 3 | 2 | 2 | 2 | 3 |
| 301 | 1 | 1 | 0 | 1 | 1 | 1 | 0 |
| ... | | | | | | | |
| 102 | 1 | 0 | 0 | 1 | 0 | 0 | 0 |
| 201 | 3 | 2 | 3 | 4 | 3 | 3 | 2 |
| 302 | 0 | 0 | | 0 | 0 | 0 | 0 |
| ... | | | | | | | |

FREE CHANNELS: 1, 2, ...
SUBSCRIBED: 101, 202, 301, ...
UNSUBSCRIBED: 102, 201, 302, ...
PAY CHANNELS: SUBSCRIBED + UNSUBSCRIBED

| CH | BROADCAST DATE | START | PROGRAM TITLE |
|---|---|---|---|
| 101 | 3/11 | 20:00 | MOVIE "ABCDE" MUSICAL |

| CH | BROADCAST DATE | START | PROGRAM TITLE |
|---|---|---|---|
| 201 | 3/13 | 16:30 | LIVE COUNTDOWN MAX |
| 201 | 3/13 | 20:00 | BACKSTREET GIRLS MUSIC HITS |
| 201 | 3/13 | 21:00 | MUSIC WIND |

FIG. 19A

| PREFERENCE MATCH DEGREE | PREFERENCE LEVEL |
|---|---|
| 0.9 OR GREATER | 5 |
| 0.8 OR GREATER | 4 |
| 0.7 OR GREATER | 3 |
| 0.6 OR GREATER | 2 |
| 0.5 OR GREATER | 1 |

FIG. 19B

| CH | MATCH DEGREE |
|---|---|
| 102 | 0.95 |
| 201 | 0.75 |
| 2 | 0.60 |
| 101 | 0.50 |
| 301 | 0.25 |

FIG. 20

| 3/13 | | PAY CHANNEL | | |
|---|---|---|---|---|
| TIME | 101 | 201 | 301 | |
| : | | | | |
| 16 | | LIVE COUNTDOWN MAX ~11 | | |
| : | | | | |
| 19 | | | ENJOYING A VACATION IN FRANCE ~15 | |
| 20 | MOVIE MUSIC "VWXYZ" ~14 | BACKSTREET GIRLS MUSIC HITS ****** ~12 | | |
| 21 | | MUSIC WIND ***** ~13 | | |
| : | | | | |

~10

CHANNEL CONTRACT PROPOSING APPARATUS, METHOD, PROGRAM AND INTEGRATED CIRCUIT

TECHNICAL FIELD

The present invention relates to a channel subscription proposal apparatus, and in particular to a technique for suggesting appropriate subscription to or cancellation of a subscription to a subscription to a channel in accordance with estimated user preferences.

BACKGROUND ART

In Japan the predecessor to digital broadcast services was CS digital broadcasting that uses a communication satellite, which was then followed with the commencement of BS digital broadcasting that uses a broadcast satellite. Currently, a new communication satellite that is located at longitude 110 degrees east, the same as BS (broadcast satellite), has been launched, and 110 degree CS digital broadcasting using this communication satellite is taking place.

Similarly with terrestrial broadcasting, the transition is being made from the present analog broadcasting to digital broadcasting. Analog broadcasting is set to end in 2011, when all terrestrial broadcasting will become digital.

In digital broadcasting, since it is possible to compress the amount of information of video and send the video in a compressed state, multi-channel broadcasting that sends a significantly larger amount of programs compared to analog broadcasting is being carried out.

With the increasing prevalence of digital broadcast services, the number of broadcast channels is growing (currently exceeding 300 channels, and increasing). While with such channels it is hoped that programs that conform closely with a user's preferences can be provided to the user, the user is forced to spend considerable time and effort to examine large amounts of program information in order to find channels providing programs that meet his/her preferences from among such a large number of channels. It is also possible that the user will miss out subscribing to a particular pay channel meeting his/her preferences because he/she was unable to find the channel.

In view of such issues, conventional techniques for introducing a user of a multi-channel program distribution service to appropriate channels to which he/she does not yet subscribe have been proposed (for instance, see patent document 1).

This technique calculates viewer ratings data relating to all channels of all users subscribing to the service, and performs cluster analysis of the calculated viewer ratings data to determine viewing patterns showing the viewing tendencies of all the subscribing users. The determined viewing patterns are matched with the viewing pattern of a target user, one viewing pattern is selected, and from among channels included in the selected viewing pattern, channels that the user does not yet subscribe to, and that are expected to conform to the user's preferences, are suggested to the user.

Patent Document 1: Japanese Patent Application Publication No. 2001-157191

DISCLOSURE OF THE INVENTION

Problem to be Solved by the Invention

However, with this conventional technique, the determined viewing patters will not necessarily represent the viewing patterns of individual users well, and therefore there is a problem that it is difficult to present a user with suggestions for channels that meet the preferences of that user.

In view of the stated problem, the present invention has an object of providing a channel subscription proposal apparatus and a channel subscription proposal method that propose subscriptions to channels that appropriately reflect a user's individual preferences.

Means to Solve the Problem

In order to solve the stated problem, a channel subscription suggestion apparatus of the present invention is a channel subscription suggestion apparatus that gives suggestions regarding subscription to a subscription channel whose broadcast programs are permitted to be viewed by subscription, including: a reception unit operable to receive program guide information relating to a plurality of programs broadcast on a plurality of channels, the program guide information showing a broadcast time of each program; an acquisition unit operable to acquire preference information showing a preference of one user with respect to programs; a determination unit operable to estimate, with reference to the program guide information and the preference information, whether each respective program meets the preference of the one user, and determine that each of one or more programs estimated to meet the preference is a recommended program; and a subscription suggestion unit operable to make a suggestion regarding subscribing to or canceling a subscription to at least one subscription channel, in accordance with a broadcast frequency of recommended programs on the subscription channel, the broadcast frequency being how many of the recommended programs are broadcast on the subscription channel.

Here, a subscription channel is a channel that can be viewed by, for instance, taking out a subscription with a broadcast enterprise that operates a channel on which a program is broadcast, and paying a viewing charge (hereinafter such channels are referred to as "pay channels").

Furthermore, the preference information is information expressing the level of a user's preference for genres of programs and the like.

Effects of the Invention

According to the stated structure, recommended programs are determined that meet the preferences of each individual user based on the preference information of that user, and a suggestion to subscribe to or cancel a subscription to a pay channel that broadcasts recommended programs can be made to each individual user according to how often recommended programs are broadcast. Therefore, recommendations can be made that accurately reflect the preferences of each individual user.

In addition, the broadcast frequency of recommended programs expected to be broadcast in the future can be taken into consideration by using the program guide information (know specifically as EPG (Electronic Program Guide information)). Therefore, subscription to a channel that is to commence broadcasting a new program that meets the user's preferences in the near future can be made.

Furthermore, the determination unit may evaluate, for each program, a match degree that shows a match degree between the preference of the user and the program, and use the determined match degree to estimate whether or not the program meets the preference of the user, and the subscription suggestion unit may make the suggestion in accordance with the match degrees in addition to the broadcast frequencies.

According to the stated structure, even if one of the programs set as recommended programs is broadcast by a pay channel that has a relatively low broadcast frequency of recommended programs, the pay channel can be recommended if the recommended program has a high match degree with the user's preferences. Therefore, channels that broadcast programs that match the user's preferences most closely can be recommended from among the recommended programs. This means that, for instance, if the program is a program that will be broadcast in the near future, the user can subscribe to the suggested channel, and therefore will not miss viewing the program.

Furthermore, the acquisition unit may include: a restriction information acquisition sub-unit operable to acquire restriction information showing a subscription charge upper limit for subscription channels, and the subscription suggestion unit may include: a notification sub-unit operable to store subscription information showing a charge for each of one or more subscribed subscription channels, and when the subscription suggestion unit makes a suggestion to subscribe to a subscription channel, if a total of the one or more charges shown by the subscription information exceeds the restriction charge upper limit, notify the user that the restriction charge upper limit is exceeded.

According to the stated structure, if the user has set a subscription charge upper limit as restriction information for subscribing to pay channels, the notification unit enables the user to confirm that the total monetary amount for currently subscribed pay channels exceeds the subscription monetary amount upper limit. This servers as a guide for the user to make a decision as to whether or not to subscribe to a pay channel.

Furthermore, the acquisition unit may acquire history information relating to a history of program recording or program viewing by the user, and acquire the preference information from the history information.

Furthermore, the program guide information may include, for each program, at least one keyword relating to content of the program, and the channel subscription suggestion apparatus may further include: a category dictionary storage unit operable to store a plurality of contribution degrees, each showing to what extent a different one of a plurality of specific keywords contributes to a different one of a plurality of categories; an evaluation vector calculation unit operable to calculate an evaluation vector whose elements are values obtained by tallying, per category, the contribution values corresponding to the specific keywords included for each program in the program guide information; and a category determination unit operable to judge, with respect to each program, which one or more categories the program belongs to, based on the evaluation vectors calculated with respect to the program, the acquisition unit may include: a history information acquisition sub-unit operable to acquire the history information; and a preference vector determination sub-unit operable to tally, per category, the evaluation vectors of categories to which the programs included in the history information belong, in order to determine a preference vector that has elements each of which is a value showing a strength of a preference of the user in a different one of the categories, the determination unit may include: a preference applicability estimation sub-unit operable to, with respect to each program included in the program guide information, (i) evaluate, as a preference degree, a value obtained by using the preference vector to weight the evaluation vector calculated for the program, and (ii) compare the evaluated preference degree with a threshold value to estimate whether or not the program meets the preference of the user, and the determination unit may determine that any one or more programs estimated by the preference applicability estimation sub-unit to meet the preference of the user are recommended programs.

According to the stated structure, the user's preferences are determined based on history information that includes information about programs recorded or viewed by the viewer in the past, and subscribing or canceling of a subscription to a pay channel is made in accordance with recommended programs estimated to meet the user's preferences. Therefore, suggestions that more accurately reflect the user's preferences can be made compared to conventional techniques.

Furthermore, the channel subscription suggestion apparatus may further include: a program display unit operable to display an electronic program table based on the program guide information, wherein the subscription suggestion unit makes the suggestion by causing the program display unit to display in a manner that, among the one or more recommended programs included in the electronic program table, any recommended program broadcast on a channel to which a subscription is suggested is distinguishable from other programs, and causing the program display unit to display in a manner that one or more channels to which a subscription is suggested are distinguishable from other channels.

According to the stated structure, the user can confirm the subscription channels being suggested and the recommended programs in the suggested subscription channels at a glance in the displayed electronic program table.

Furthermore, the subscription suggestion unit, when making the suggestion, may present to the user at least one of (a) program guide information relating to the one or more recommended program, (b) a temporal transition of the broadcast frequency of the one or more recommended programs, and (c) the broadcast frequency of the one or more recommended programs on a plurality of channels that include the subscription channels.

According to the stated structure, a user to whom a suggestion is being made to subscribe to or cancel a subscription to a pay channel can know the grounds for the suggestion according to the display of the list or the like of recommended programs that match the user's preferences, and can easily make a decision regarding subscribing to or canceling a subscription to the pay channel.

Furthermore, the acquisition unit may acquire preference information of a plurality of users, the determination unit may determine one or more recommended program respectively for each user, using the preference information of the respective user, and the subscription suggestion unit may specify, for each user, one or more subscription channels to suggest to the user in accordance with the broadcast frequency of the one or more recommended programs for the user, determine a subscription channel, from among the specified subscription channels, to suggest commonly to all users, based on how many users the suggestion is to be made to, and may suggest subscribing to or canceling a subscription to the determined subscription channel.

According to the stated structure, an overall suggestion common to all of a plurality of users can be made by tallying the individual suggestions for each of users.

For instance, when the channel subscription suggestion apparatus is applied to a server apparatus that distributes programs to individual terminals of individual members of a family via a home network, an overall suggestion that is acceptable to the whole family can be obtained by tallying the individual suggestion for each individual family member. This kind of overall suggestion is especially useful in obtaining the whole family's satisfaction in subscribing or canceling a subscription to a pay channel when the total number of pay channels that can be subscribed to is restricted in monetary terms.

Furthermore, the acquisition unit may acquire history information relating to program recording or program viewing by the one user, and acquire the preference information from the history information, and the subscription suggestion unit may set, with respect to each user, a threshold value such that the more programs that are included in the history information, the more likely subscribing is to be suggested and the less likely canceling is to be suggested, and for each user, compare the threshold value set with respect to said user with each broadcast frequency, in order to specify the one or more subscription channels to be suggested to said user.

According to the stated structure, an individual suggestion for a user who, for instance, watches television frequently can be given more weight in overall suggestions than an individual suggestion for a user who does not watch television as much. Therefore, a highly fair overall suggestion can be made.

Furthermore, a channel subscription suggestion method of the present invention is a channel subscription suggestion method that gives suggestions regarding subscription to a subscription channel whose broadcast programs are permitted to be viewed by subscription, including: a reception step of receiving program guide information relating to a plurality of programs broadcast on a plurality of channels, the program guide information showing a broadcast time of each program; an acquisition step of acquiring preference information showing a preference of one user with respect to programs; a determination step of estimating, with reference to the program guide information and the preference information, whether each respective program meets the preference of the one user, and determining that each of one or more programs estimated to meet the preference is a recommended program; and a subscription suggestion step of making a suggestion regarding subscribing to or canceling a subscription to at least one subscription channel, in accordance with a broadcast frequency of recommended programs on the subscription channel, the broadcast frequency being how many of the recommended programs are broadcast on the subscription channel.

Furthermore, the acquisition step may acquire preference information of a plurality of users, the determination step may determine one or more recommended program respectively for each user, using the preference information of the respective user, and the subscription suggestion step may specify, for each user, one or more subscription channels to suggest to the user in accordance with the broadcast frequency of the one or more recommended programs for the user, determine a subscription channel, from among the specified subscription channels, to suggest commonly to all users, based on how many users the suggestion is to be made to, and suggest subscribing to or canceling a subscription to the determined subscription channel.

By making channel subscription suggestions following these methods, effects as those already described can be achieved.

BRIEF DESCRIPTION OF THE DRAWINGS

FIG. 3 shows an example of the structure and content of a category dictionary table;

FIG. 4 is an example of EPG information, program category information, preferred program information and recommended program information stored integrated into one table;

FIG. 5 is a functional block diagram showing the structure of a subscription suggestion unit 400 in detail;

FIG. 6 shows an example of the structure and content of a channel information table;

FIG. 7 is an example of the structure and contents of a channel-by-channel recommended program list;

FIG. 8 is an example of the structure and contents of frequency distribution information;

FIG. 9 expresses schematically extended count distribution information that manages in correspondence recommended program counts and EPG information relating to the recommended program counts;

FIG. 19A shows an example of the structure and contents of a preference match degree level table, and FIG. 19B shows an example of a channel-by-channel match degree list 30;

FIG. 20 shows a display example of an electronic program table; and

FIG. 21 is a structural drawing of a home network that includes a channel subscription suggestion apparatus 100a.

DESCRIPTION OF NUMBERING

Figure 1:
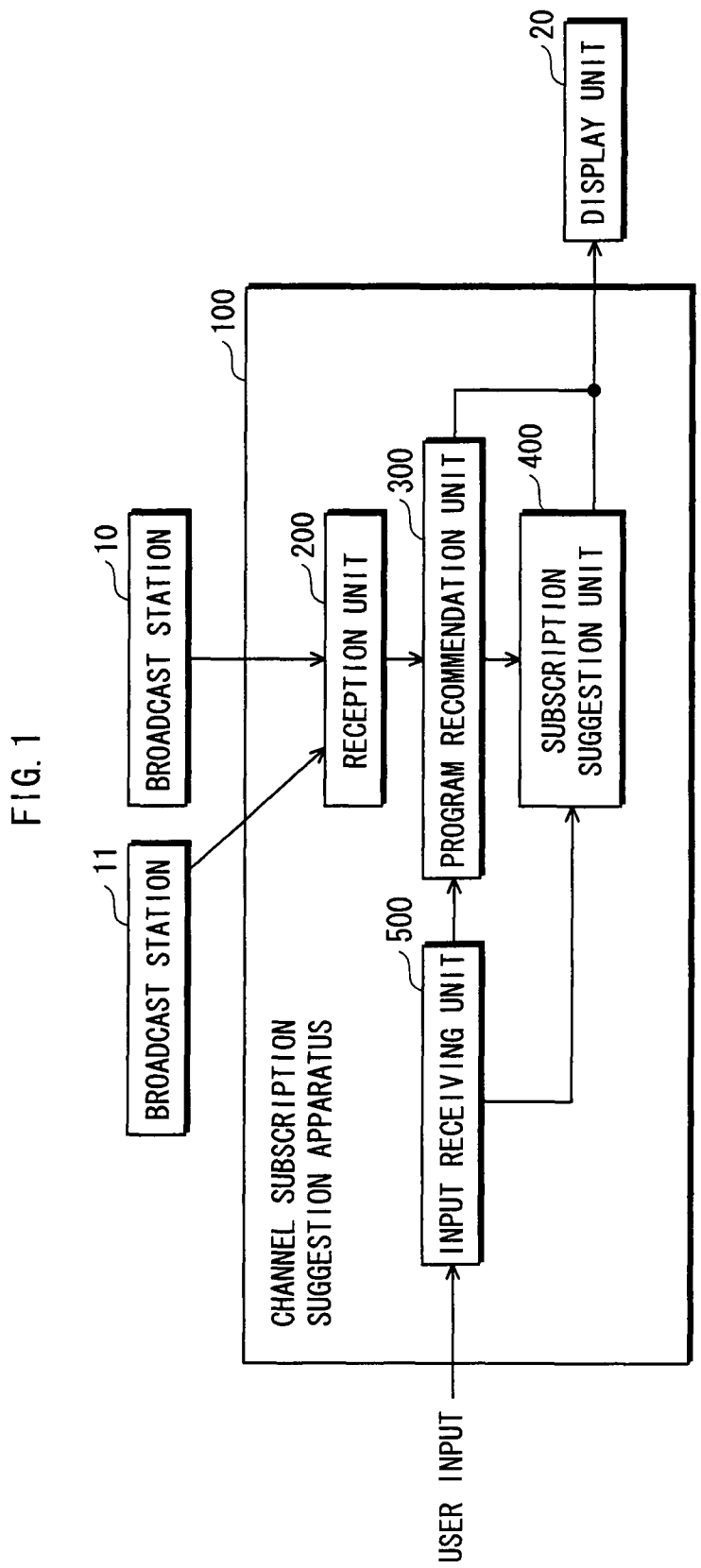
FIG. 1 is a function block diagram showing the structure of a channel subscription suggestion apparatus 100.

1 Evaluation vector calculation unit
2 Category determination unit
3 Preference vector determination unit
4 Preference applicability estimation unit
5 Category dictionary maintenance unit
10, 11 Broadcast station
20 Display unit
100, 100a Channel subscription suggestion apparatus
200 Reception unit
300 Program recommendation unit
301 EPG information acquisition unit
302 History information acquisition unit
303 RAM
304 CPU
305 ROM
306 Display control unit
400 Subscription suggestion unit
401 Channel information storage unit
402 Channel-by-channel statistic processing unit
403 Channel-by-channel recommended program storage unit
404 Channel suggestion unit
405 Display control unit
406 Threshold value storage unit
500 Input receiving unit
900 Home network
901 Server
902, 903 Terminal

BEST MODE FOR CARRYING OUT THE INVENTION

The following described preferred embodiments of the present invention with reference to the drawings.

(First Embodiment)
<Structure>

FIG. 1 is a function block diagram showing the structure of a channel subscription suggestion apparatus 100 in a first embodiment of the present invention.

The channel subscription suggestion apparatus 100, as shown in FIG. 1, includes a reception unit 200, an input receiving unit 500, a program recommendation unit 300 and a subscription suggestion unit 400.

The following describes the functions of each unit.

(Reception Unit 200)

In the channel subscription suggestion apparatus 100, the reception unit 200 has a function of receiving EPG information for all programs broadcast on each channel from broadcast stations 10 and 11.

The reception unit 200 may separate the EPG information from a broadcast signal on which the EPG information and a broadcast program are multiplexed, or may receive the EPG information from a separate route to the broadcast (the Internet, for instance).

The EPG information includes, for each program, information regarding at least the channel on which the program is broadcast and the program name. The EPG information may additionally include information such as a description of the program or a listing of the genre of the program.

Note that in the present embodiment the EPG information is acquired for all channels, regardless of whether or not the user subscribes thereto.

(Program Recommendation Unit 300)

The program recommendation unit 300 has a function of determining a user's preferences based on a history of recording or viewing programs by the user, and determining, from the EPG information, recommended programs that match the user's preferences and are to be broadcast within a predetermined time period from the date when the proposal regarding the pay channel is made (hereinafter, this date is referred to as a reference date). The program recommendation unit 300 also has the function of sending recommended program information that shows the determined recommended programs.

(Subscription Suggestion Unit 400)

The subscription suggestion unit 400 has a function of calculating how many recommended programs are broadcast each day by each channel broadcasting any recommended programs determined by the program recommendation unit 300. The subscription suggestion unit 400 also has a function of suggesting subscribing to or canceling a subscription to a channel (hereinafter, canceling a subscription to a channel is simply referred to as canceling a channel) in accordance with a broadcast frequency of the recommended programs (i.e. how often recommended programs are broadcast), by comparing the tallied results with a threshold value.

(Display Unit 20)

The display unit 20 is realized by, for instance, a liquid crystal display, and has a function of displaying EPG information, tallied results and suggestions regarding recommended programs.

(Input Receiving Unit 500)

The input receiving unit 500 has a function of receiving instruction operations with respect to the channel subscription suggestion apparatus 100 from the user.

The input receiving unit 500 may, for instance, be a switch that directly receives operations from the user, or a remote control signal reception unit that receives user operation information expressing the contents of operations performed by the user with respect to a remote control that is separate to the channel subscription suggestion apparatus 100.

Note that the user operation information may, for instance, be information specifying a program that the user has seen on a display apparatus such as a television that is separate to the channel subscription suggestion apparatus 100 and felt to be interesting, or information for directly specifying the extent of the user's preference of individual categories.

The following describes the program recommendation unit 300 and the subscription suggestion unit 400 in more detail.

Figure 2:
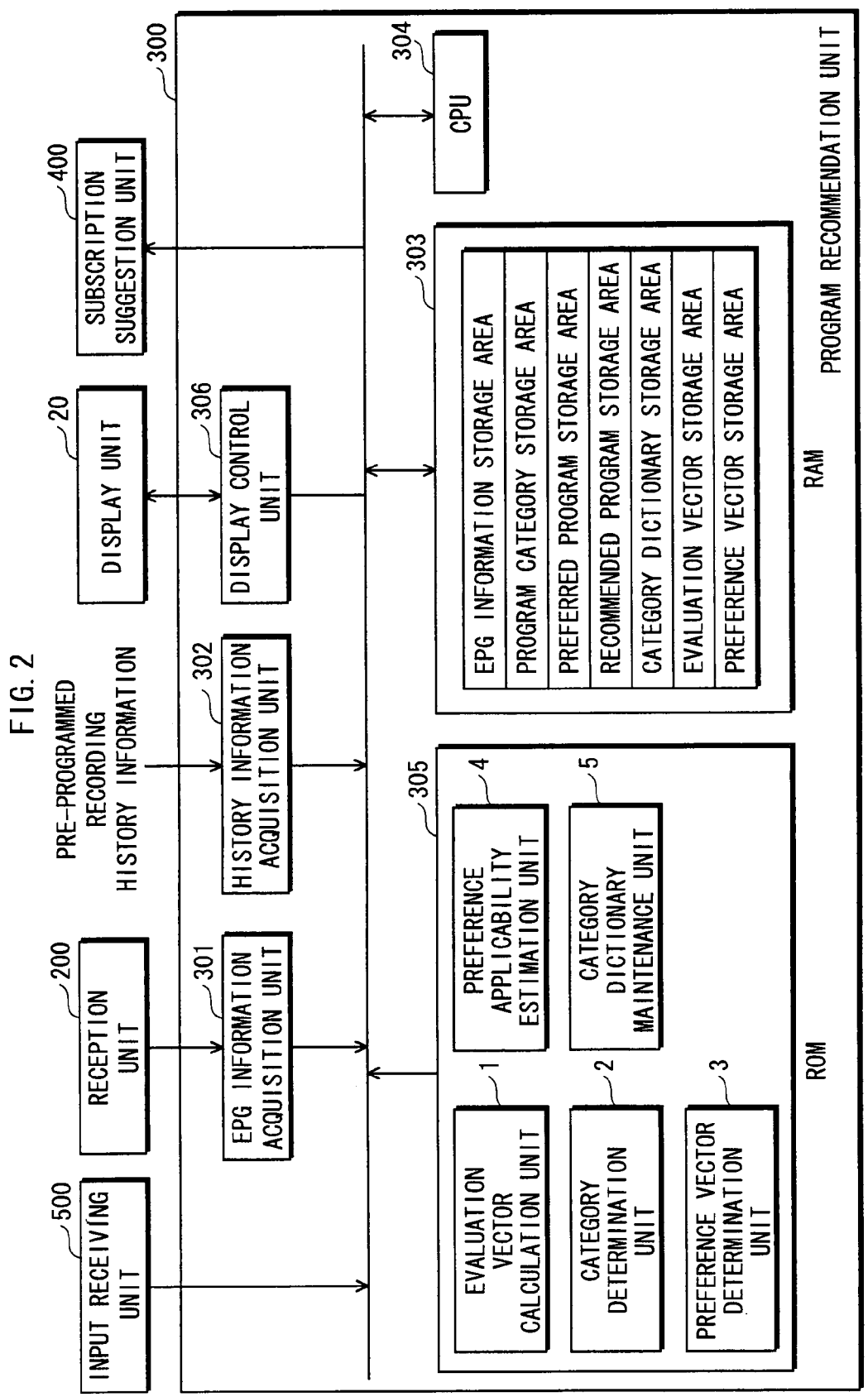
FIG. 2 is a function block diagram showing the structure of a program recommendation unit 300 in detail.

FIG. 2 is a function block diagram showing the structure of the program recommendation unit 300 in detail.

The program recommendation unit 300 includes an EPG information acquisition unit 301, a history information acquisition unit 302, a RAM 303, a CPU 304, a ROM 305, and a display control unit 306.

(EPG Information Acquisition Unit 301)

The EPG information acquisition unit 301 has a function of acquiring EPG information from the reception unit 200, and writing the acquired EPG information to an EPG information storage area in the RAM 303.

Note that in writing the acquired EPG information to the EPG information storage area, when EPG information relating to a same program already exists, the EPG information acquisition unit 301 overwrites the existing EPG information with the EPG information received from the reception unit 200.

The EPG information acquisition unit 301 further has a function of outputting information relating to a new channel that has not been included in EPG information acquired in the past, to the subscription suggestion unit 400 when information relating to the new channel is found to be included in the acquired EPG information.

(History Information Acquisition Unit 302)

The history information acquisition unit 302 has a function of acquiring history information showing a program that a user has pre-programmed a recording apparatus to record, designating the program included in the acquired history information as a preferred program, and storing information relating to the preferred program (hereinafter, referred to as preferred program information) to a preferred program storage area in the RAM 303. Note that the recording apparatus is, for instance, a DVD recorder connected to the channel subscription suggestion apparatus 100 via a home network or the like.

Here, the acquired history information is information showing a channel, a broadcast date and time, or the like, that specify the program that the user pre-programmed the recording of. The preferred program information includes the channel, broadcast date and time or the like of the specified preferred program.

Note that if identification information has been allocated to individual programs, the history information can be expressed using the identification information.

(ROM 305)

The ROM 305 stores various computer programs for realizing processing by the program recommendation unit 300. As a result of the CPU 304 cooperating with hardware to execute these computer programs, the functions of an evaluation vector calculation unit 1, a category determination unit 2, a preference vector determination unit 3, a preference applicability estimation unit 4 and a category dictionary maintenance unit 5 are realized as concrete means.

(Evaluation Vector Calculation Unit 1)

The evaluation vector calculation unit 1 has a function of tallying and normalizing, per category, contribution levels corresponding to keywords included in the EPG information for each program broadcast in a predetermined period that includes the reference date, and calculating evaluation vectors whose constituent values are the contribution levels. The evaluation vector calculation unit 1 also has the function of storing the calculated evaluation vectors to an evaluation vector storage area in the RAM 303.

(Category Determination Unit 2)

The category determination unit 2 has a function of determining which one or more categories a program belongs to, based on whether or not the constituent values of the evaluation vectors calculated by the evaluation vector calculation unit 1 for the program are greater than a threshold value. The category determination unit 2 also has the function of storing the determined program categories to a program category storage area in the RAM 303.

The category determination unit 2 performs the described processing for each program for which evaluation vectors have been calculated.

(Preference Vector Determination Unit 3)

The preference vector determination unit 3 has a function of tallying the evaluation vectors in each category for all preferred programs broadcast in a predetermined period before a reference date, and using the results of the tallying to calculate a preference vector showing preferences of a user. The preference vector determination unit 3 also has the function of storing the found preference vector to a preference vector storage area in the RAM 303.

(Preference Applicability Estimation Unit 4)

The preference applicability estimation unit 4 has the function of evaluating a match degree of each program with the user's preferences, based on the elements of the preference vector and the evaluation vectors of the programs included in the EPG information of programs broadcast in a predetermined period after the reference date, estimating that any programs for which the match degree is greater than a predetermined threshold value match the user's preferences, and setting the one or more programs estimated to match the user's preferences as recommended programs.

The preference applicability estimation unit 4 also has the function of storing recommended program information regarding programs set as recommended programs to a recommended program storage area, and sending a recommended program list showing the recommended program information to the channel subscription suggestion unit 400.

(Category Dictionary Maintenance Unit 5)

The category dictionary maintenance unit 5 has a function of performing processing to add and/or delete a keyword to/from the category dictionary, and processing to add and/or update a contribution value in the category dictionary.

The processing for adding a keyword is performed based on the evaluation vectors for preferred programs in a predetermined period in the past.

More specifically, when all the elements of the evaluation vectors for the preferred program are "0.00", in other words when a keyword included in the EPG information corresponding to the preferred program does not exist in the category dictionary, the category dictionary maintenance unit 5 adds the keyword to the category dictionary.

The category dictionary maintenance unit 5 then performs update processing of contribution levels for each keyword in each category in the category dictionary that includes the newly added keyword.

More specifically, the category dictionary maintenance unit 5 calculates a new contribution level for each category in accordance with a ratio of (i) the number of keywords included in the EPG information corresponding to all programs in a predetermined period in the past, and (ii) the number of keywords included in the EPG information corresponding to the preferred program. The category dictionary maintenance unit 5 updates the category dictionary with the newly calculated contribution levels.

After updating the contribution levels for all keywords, the category dictionary maintenance unit 5 deletes any keywords whose contribution level is "0.00" in every category.

(Display Control Unit 306)

The display control unit 306 has a function of controlling so as to have information, such as information relating to recommended programs, displayed by the display unit 20.

(RAM 303)

The RAM 303 is a memory for storing various information used in processing to determine recommended programs. In addition to the EPG information storage area and the preferred program storage area, a program category storage area, a recommended program storage area, a category dictionary storage area, an evaluation vector storage area, and a preference vector storage area are provide in the RAM 303.

(EPG Storage Area)

The EPG storage area stores the EPG information.

(Preferred Program Storage Area)

The preferred programs storage area stores not only preferred program information specified by the history information acquisition unit 302, but also preferred program information pertaining to one or more programs shown by user operation information acquired via the input reception unit 500.

(Category Dictionary Storage Area)

The category dictionary storage area stores the category dictionary.

The category dictionary defines a plurality of categories, a plurality of keywords, and contribution levels for the keywords in each category.

The categories may be categories that are different to the genres in the EPG information, or may be the same types as the genres in the EPG information.

Note that the categories are used as a framework for expressing a user's preferences and directivity of programs.

More specifically, the category dictionary is used to define evaluation vectors expressing the directivity of programs, the elements of the evaluation vectors being the strength of directivity in each category, and to define a preference vector expressing the user's preferences, the elements of the preference vector being the strength of preferences in each category.

(Evaluation Vector Storage Area)

The evaluation vector storage area stores the evaluation vectors of programs.

(Program Category Storage Area)

The program category storage area stores information showing one or more categories that a program is determined to belong to based on the evaluation vectors of the program.

(Preference Vector Storage Area)

The preference vector storage area stores a preference vector that is described later.

(Recommended Program Storage Area)

The recommended program storage area stores recommended program information showing recommended programs estimated to match a user's preferences.

The following describes the subscription suggestion unit 400.

FIG. 5 is a functional block diagram showing the structure of the subscription suggestion unit 400 in detail.

The subscription suggestion unit 400, as shown in FIG. 5, includes a channel information storage unit 401, an channel-by-channel statistic processing unit 402, an channel-by-channel recommended program storage unit 403, a channel suggestion unit 404, and a display control unit 405.

The functions of each of the units in the subscription suggestion unit 400 may be implemented by software.

In such a case, the channel information storage unit 401, the channel-by-channel statistic processing unit 402, the channel-by-channel recommended program storage unit 403, the channel suggestion unit 404, the display control unit 405, and a threshold value storage unit 406 correspond to program modules for realizing the respective functions as concrete means.

The corresponding functions are realized by a CPU (not illustrated) cooperating with hardware resources to execute the program modules.

The following describes the functions of the units.

(Channel Information Storage Unit 401)

The channel information storage unit 401 has a channel information table (described later), and has a function of storing channel information for each channel, showing which of a free channel or a pay channel the channel is.

For pay channels, the channel information includes the user's viewing subscription state (subscribed or unsubscribed), and channel viewing charge information.

(Channel-by-Channel Statistic Processing Unit 402)

The channel-by-channel statistic processing unit 402 has a function of receiving a recommended program list from the program recommendation unit 300. The recommended program list is EPG information relating to recommended programs only (the channel, the broadcast date, the start time, and the program title).

The channel-by-channel statistic processing unit 402 also has the function of generating an channel-by-channel recommended program list by referring to the channel information table, and generating a channel-by-channel recommended program list by classifying the listings in the received recommended program list according to whether each channel is a pay channel or a free channel, and by the user's subscription state.

The channel-by-channel statistic processing unit 402 also has a function of generating frequency distribution information by counting how many recommended programs are shown in the channel-by-channel recommended program list for each channel in each of a predetermined period (for instance, one day).

(Channel-by-Channel Recommendation Storage Unit 403)

The channel-by-channel recommendation storage unit 403 stores the channel-by-channel recommended program list and the frequency distribution information. The channel-by-channel recommendation storage unit 403 may also manage, as an extension of the frequency distribution information, the number of recommended programs and EPG information relating to the recommended programs.

(Channel Suggestion Unit 404)

The channel suggestion unit 404 includes a threshold value storage unit 406.

The channel suggestion unit 404 has a function of receiving an subscription reference frequency and a cancellation reference frequency from the user via the input receiving unit 500, and storing the subscription reference frequency and the cancellation reference frequency in advance in the threshold value information storage unit 406. Here, the subscription reference frequency is a reference level for suggesting subscribing to a channel, and the cancellation reference frequency is a reference level for suggesting canceling a channel.

The channel suggestion unit 404 also has a function of comparing the subscription reference frequency with the broadcast frequency of recommended programs for each unsubscribed pay channel in the frequency distribution information, and judging that a channel whose broadcast frequency exceeds the subscription reference frequency is a channel to which subscription is to be suggested (hereinafter, referred to as a "subscription suggested channel").

The channel suggestion unit 404 also has the function of comparing the cancellation reference frequency with the broadcast frequency of recommended programs for each subscribed pay channel in the frequency distribution information, and judging that a channel whose broadcast frequency is below the cancellation reference frequency is a channel for which cancellation is to be suggested (hereinafter, referred to as a "cancellation suggested channel").

The channel suggestion unit 404 also has the function of conveying information showing one or more subscription suggested channels and one or more cancellation suggested channels to the display control unit 405.

The channel suggestion unit 404 also has the function of connecting, via a communication network, to a server of a broadcast communication enterprise that operates pay channels, and when a user operation to subscribe to or cancel that channel is received in response to a suggestion, connecting to the server of the broadcast communication enterprise that operates said channel, and executing processing relating to the user operation. Note that the server, which is external to the channel subscription apparatus 100, is not illustrated.

(Display Control Unit 405)

The display control unit 405 has a function of displaying, on the display unit 20, a form for suggesting subscribing to a subscription suggested channel shown in the information conveyed from the channel suggestion unit 404, and a form for suggesting canceling a suggested channel shown in the information conveyed from the channel suggestion unit 404.

<Data>

The following describes the data tables stored in the program recommendation unit 300 and the subscription suggestion unit 400.

FIG. 3 shows an example of a category dictionary table.

As shown in FIG. 3, the category dictionary defines a plurality of keywords and a plurality of categories, and further defines, with respect to each keyword in each category, a contribution level in a range from 0.00 to 1.00.

The contribution level is a value showing relevance between a certain keyword and a certain category. The higher the relevance with the category is, the higher the value assigned to the keyword is.

For instance, the contribution level of the key word "accommodation" with respect to the category "travel" is assigned a value "1.00", showing that this keyword is considered to be invariably relevant to this category.

In contrast, a keyword that is considered to be irrelevant to a particular category is given a contribution level of "0.00". An example of this is as the contribution level of the keyword "menu" with respect to the category "travel".

Of course, intermediate contribution levels having values between 0.00 and 1.00 can also be set. For instance, the keyword "France" has a contribution level of 0.50 with respect to the category "travel", a contribution level of 0.40 with respect to the category "gourmet", and a contribution level of "0.10" with respect to the category "cooking".

Setting kind of intermediate contribution value for a keyword that appears relatively frequently in relation to a plurality of categories in the EPG information reduces inconvenience caused by a particular keyword in the EPG interfering in an unanticipated category when tallying the contribution values for each category.

It is not necessary to always use the category dictionary as set in advance. The content of the category dictionary may be changed at times in accordance with user operations.

FIG. 4 shows an example of EPG information, program category information, preferred program information, and recommended program information stored integrated into one table.

Each one row in this table corresponds to one program.

In this table, a CH (channel) column, a broadcast date column, a start time column, and a program title column hold EPG information set by the EPG information acquisition unit 301.

The title of each program identified by the contents of the CH column, the broadcast date column and the start time column is held in the program title column.

In addition to the stated information, information such as genre information and program description information may be stored as the EPG information.

Furthermore, a program category (evaluation V) column, a preferred program column, and a recommended program column hold program category information, preferred program information, and recommended program information, respectively.

Note that the program category (evaluation V) column shows categories that programs are defined as belonging to in the program category information determined by the category determination unit 2. The evaluation vectors of the categories are shown in parentheses.

In the present embodiment, the category determination unit 6 determines that a particular program belongs to a particular category if the evaluation vector for the category is 0.05 or greater.

The preferred program information uses "YES" to indicate any program that is shown to have been a recording target in the history information, or has been viewed by the user and, according to an operation by the user, has been shown to be interesting. The programs for which "YES" is shown in the preferred program column in FIG. 4 are preferred programs.

The recommended program information uses "YES" to indicate programs estimated to match the user's preferences, and the programs for which "YES" is shown in the recommended program column in FIG. 4 are recommended programs.

FIG. 6 shows an example of the structure and content of the channel information table.

The channel information table stores channels, subscription states and charges in association.

When the channel information storage unit 401 receives EPG information regarding a new channel from the program recommendation unit 300, or when the user newly subscribes to or cancels a channel, the channel information storage unit 401 updates the channel information table to reflect the change.

FIG. 7 is an example of the structure and contents of the channel-by-channel recommended program list.

The channel-by-channel recommended program list associates channels, broadcast dates, start times, and program titles, differentiating between pay channels and free channels, and in the case of free channels, further differentiating between subscribed channels and unsubscribed channels.

FIG. 8 is an example of the structure and contents of frequency distribution information.

The frequency distribution information associates each channel with a count showing how many recommended programs are broadcast each one day.

FIG. 9 expresses schematically frequency distribution information that, in the frequency information shown in FIG. 8, realizes correspondence management by holding a pointer to the recommended program count and the recommended programs corresponding to the channel-by-channel recommended program list.

<Operations>

The following describes the operations by the units of the channel subscription suggestion apparatus 100.

Figure 17:
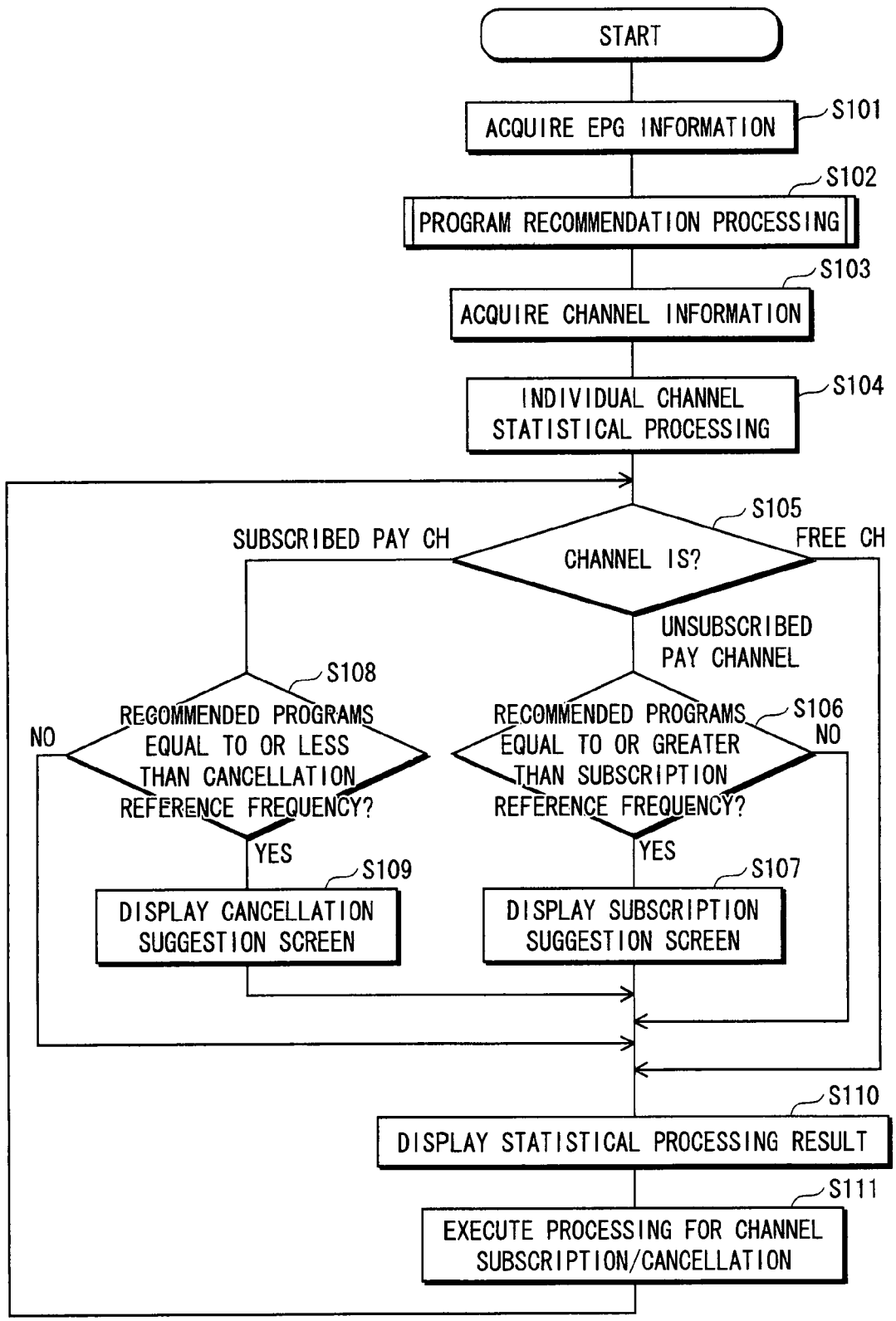
FIG. 17 is a flowchart showing overall operations by the channel subscription suggestion apparatus 100.

FIG. 17 is a flowchart showing overall operations by the channel subscription suggestion apparatus 100.

The reception unit 200 receives EPG information for all channels (step S101).

The program recommendation unit 300 performs program recommendation processing for determining recommended programs from among the programs shown in the acquired EPG information, and sends the resultant recommended program list to the channel-by-channel statistic processing unit 402 (step S102).

Details of the program recommendation processing are given later.

The channel-by-channel statistic processing unit 402 receives information relating to a newly-found channel in the EPG information from the program recommendation unit 300, and updates the channel information (step S103).

Next, the channel-by-channel statistic processing unit 402 receives the recommended program list from the program recommendation unit 300, and reads the channel information table stored in the channel information storage unit 401. Based on the recommended program list and the channel information table, the channel-by-channel statistic processing unit 402 classifies the recommended programs according to type of channel (pay channel or free channel), and the subscription state of the user, and generates a channel-by-channel recommended program list and frequency distribution information (step S104).

The channel suggestion unit 404 judges, with respect to each channel in the frequency distribution information, whether the channel is a free channel, a subscribed pay channel or an unsubscribed pay channel (step S105).

The channel suggestion unit 404 selects each channel that is an unsubscribed pay channel, and reads the subscription reference frequency from the threshold value storage unit 406 (step S105: "unsubscribed pay CH"). The channel suggestion unit 404 compares broadcast frequency of recommended programs for each selected channel in the frequency distribution information with the subscription reference frequency (step S106).

When the broadcast frequency of a channel exceeds the subscription reference frequency (step S106: YES), the channel suggestion unit 404 instructs the display control unit 405 to display an image suggesting subscribing to the channel, and the display control unit 405 has the display unit 20 display an image suggesting subscribing to the channel (step S107).

The channel suggestion unit 404 also selects each subscribed pay channel, and reads the cancellation reference frequency from the threshold value storage unit 406 (step S105: subscribed pay CH). The channel suggestion unit 404 compares broadcast frequency of recommended programs for each selected channel in the frequency distribution information with the cancellation reference frequency (step S108).

When the broadcast frequency of a channel is below the subscription reference frequency (step S108: YES), the channel suggestion unit 404 instructs the display control unit 405 to display an image suggesting canceling the channel, and the display control unit 405 has the display unit 20 display an image suggesting cancellation of a subscription to the channel (step S109).

After the suggestion of subscribing to or canceling a channel at step S107 or step S109, when an operation for displaying a statistic processing result is received from the user via the input reception unit 500, the display control unit 405 displays an image showing the statistic processing result relating to the received operation on the display unit 20 (step S110). Note that statistic processing results may also be displayed for free channels.

After step S110, when a user operation is received to perform processing for subscribing to or canceling a suggested channel, the channel suggestion unit 404 connects to the server of the communication enterprise that operates the channel, and executes processing designated by the user operation (step S111).

Note that when the channel suggestion unit 404 selects a free channel at step S105 (step S105: free CH), when the judgments at step S107 and step S109 are negative, the channel suggestion unit 404 moves to step S110, and repeats the processing from step S105 to step S111 for each suggested channel.

The following describes details of the operations in the program recommendation processing at step S102.

Figure 18:
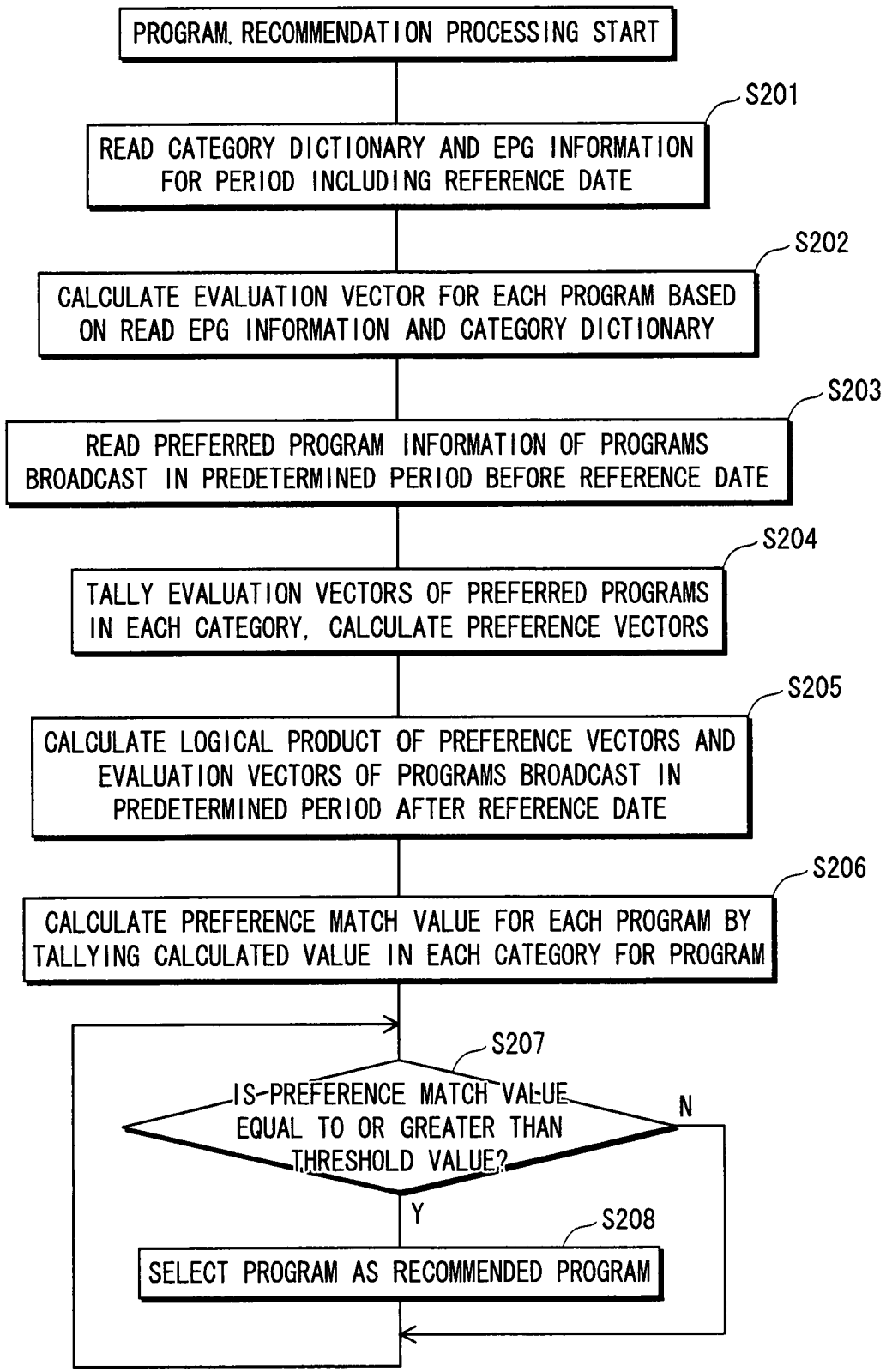
FIG. 18 is a flowchart showing operations in program recommendation processing by the program recommendation unit 300.

FIG. 18 is a flowchart showing operations in program recommendation processing. The following describes operations by the program recommendation unit 300 with use of FIG. 18.

At step S201, the evaluation vector calculation unit 1 reads the EPG information of the programs that, among the programs in the EPG information stored in the EPG information storage area, are broadcast in a predetermined period that includes the reference date, and reads the category dictionary table stored in the category dictionary storage area.

Next, the evaluation vector calculation unit 1 detects the one or more keywords in the category dictionary table for the program title of each program included in the read EPG information, and calculates an evaluation vector for each program by tallying the contribution level of each detected keyword. The evaluation vector calculation unit 1 stores the calculated evaluation vectors in the evaluation vector storage area.

The category determination unit 2 determines that a program belongs to any one or more categories for which the evaluation vector found by the evaluation vector calculation unit 1 is equal to or greater than a threshold value, and stores the determination result to the program category storage area (step S202).

After step S202, the preference vector determination unit 3 reads, from the preference program information, preferred program information for preferred programs broadcast within a predetermined period before the reference date (step S203).

The preference vector determination unit 3 reads, from the evaluation vector storage area, the evaluation vectors of the preferred programs shown by the preferred program information read at step S202, and calculates preference vectors by tallying the read evaluation vectors by category (step S204).

After step S204, the preference applicability estimation unit 4 reads, from the evaluation vector storage area, the evaluation vectors of programs broadcast in a predetermined period after the reference date, and reads the preference vectors from the preference vector storage area. The preference applicability estimation unit 4 calculates the logical product of (i) the evaluation vector of each read program and (ii) each element of the preference vector, and evaluates the level of match between the preference of the user and each category of each program (step S205). Note that in the present embodiment, calculating the logical product of an evaluation vector and a preference vector is an expression used to refer to extracting common elements in a group of evaluation vectors and preference vectors of differing dimensions, and using the smallest value among the evaluation vectors or the preference vectors for each category.

After step S205, the preference applicability estimation unit 4 calculates a preference match degree for each program by tallying by category the values of calculated at step S205 for each program (step S206).

Next, the preference applicability estimation unit 4 judges, with respect to each preference match degree calculated at step S206, whether or not said preference match degree is equal to or greater than a threshold value (step S207).

When it is judged at step S207 that the preference match degree of the program is equal to or greater than the threshold value (step S207: Y), the preference applicability estimation unit 4 sets the program as a recommended program (step S208).

Furthermore, when it is judged at step S207 that the preference match degree of the program is lower than the threshold value (step S207: N), the preference applicability estimation unit 4 ends processing with respect to the program.

The processing from S207 onwards is repeated for other programs broadcast within the predetermined period after the reference date.

<Example of Operations>

The following describes an example of operations in accordance with the operational flow of FIGS. 17 and 18.

Note that the following description is based on the assumption that the channel subscription suggestion apparatus 100 stores the category dictionary table (FIG. 3) and the channel information table (FIG. 6) in advance.

Figure 10:
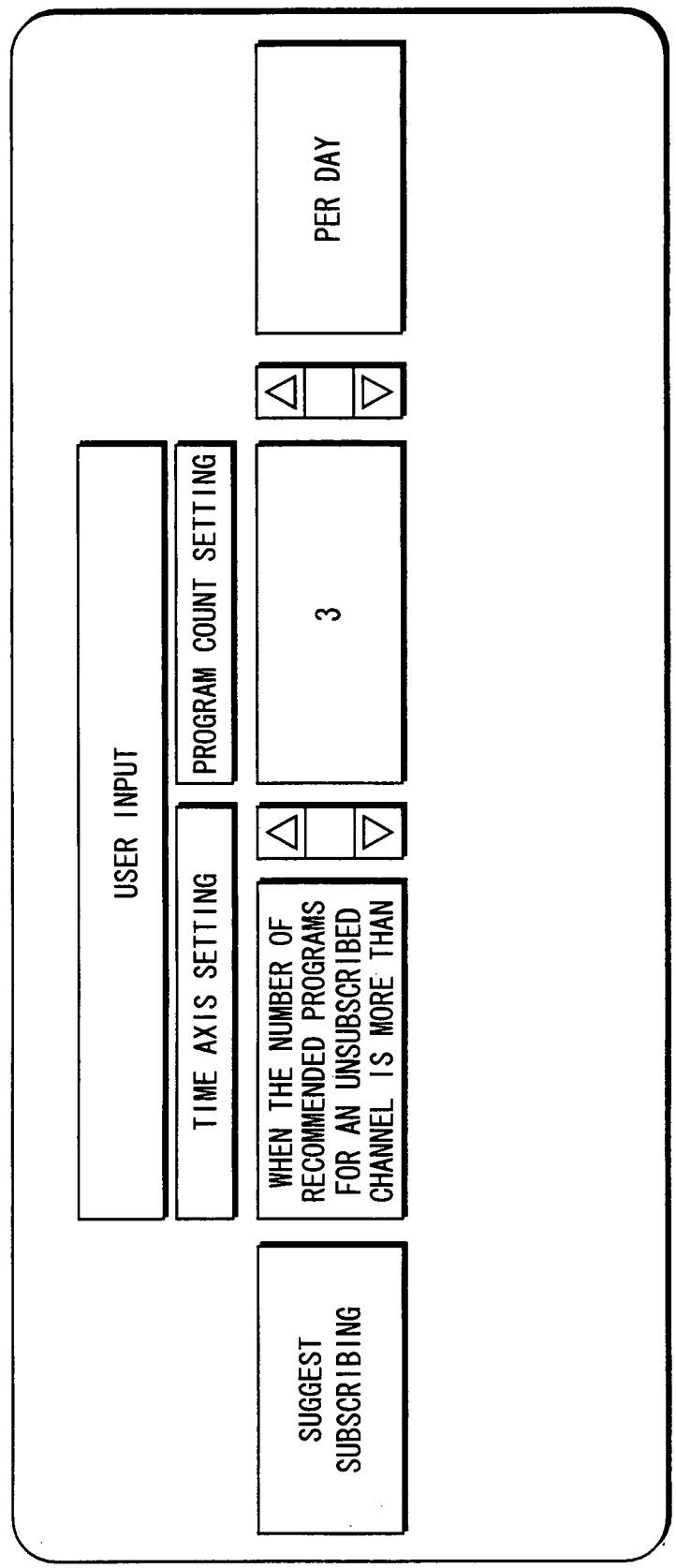
FIG. 10 is an example of a form for receiving an subscription reference frequency.
Figure 11:
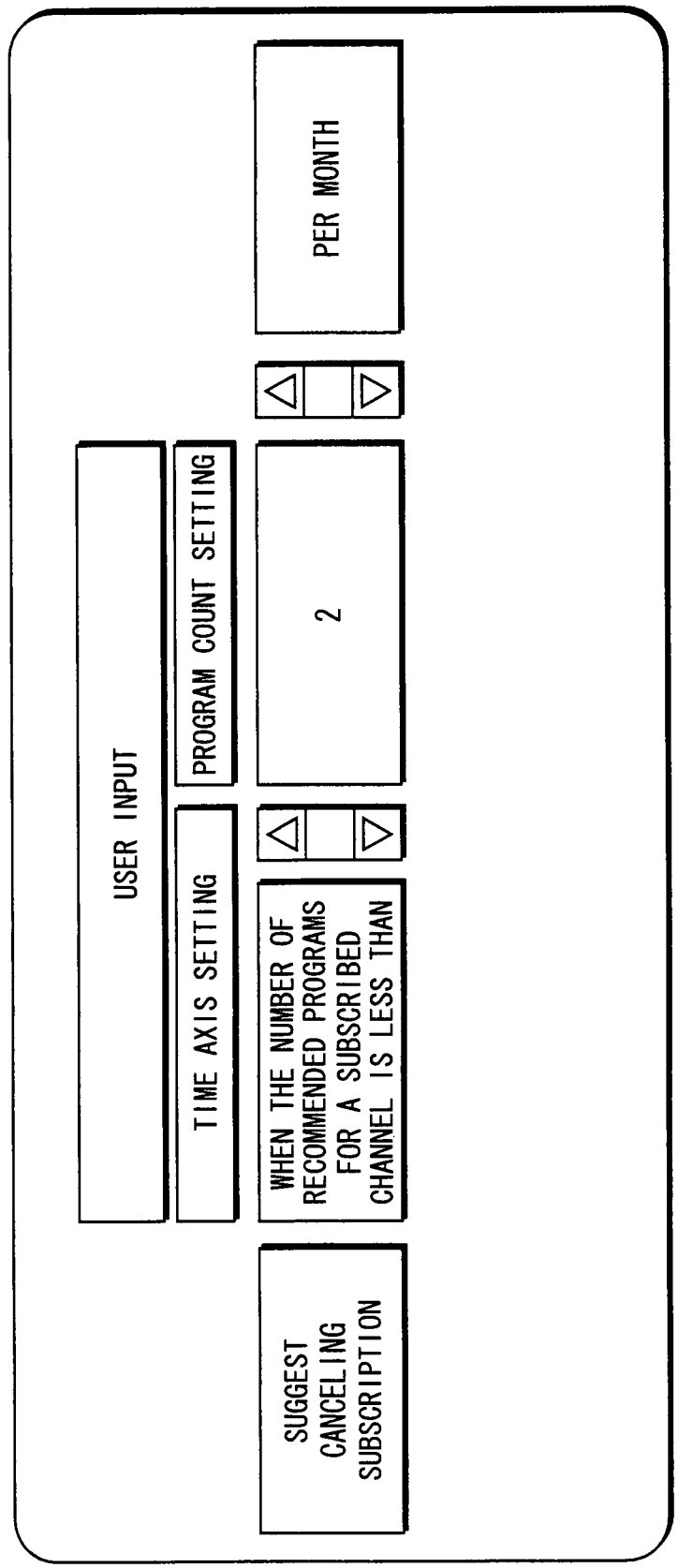
FIG. 11 is an example of a form for receiving a cancellation reference frequency.

Furthermore, the channel suggestion unit 404 receives input of a subscription reference frequency and a cancellation reference frequency through the forms shown in FIG. 10 and FIG. 11, and stores these reference frequencies in the threshold storage unit 406.

Here, FIG. 10 and FIG. 11 are merely examples of the forms for receiving the subscription reference frequency and the cancellation reference frequency.

These forms are displayed on the display unit 20, for instance. The input reception unit 500 receives a predetermined input operation that the user performs while looking at these forms.

More specifically, the form shown in FIG. 10 asks what the minimum number of recommended programs broadcast in how long a period should be to recommend subscribing to an unsubscribed channel. The user inputs a frequency of "3 per day", for instance as the subscription reference frequency.

The form shown in FIG. 11 asks how few recommended programs should be broadcast in how long a period to recommend canceling a subscription to a subscribed channel. The user inputs a frequency of "2 per month", for instance, as the cancellation reference frequency.

The input subscription reference frequency and cancellation reference frequency are set in the threshold storage unit 406.

In the present example of operations, the reference date for making suggestions regarding a channel subscription is March 10, and the predetermined period in the program recommendation processing is one week.

The following describes an example of operations based on the described conditions.

In step S101 of FIG. 17, the reception unit 200 receives EPG information for each channel broadcast date and program name shown in FIG. 4, and stores the received EPG information to the EPG information storage area.

At step S102, the program recommendation unit 300 performs program recommendation processing.

In FIG. 18, the evaluation vector calculation unit 1 reads EPG information (FIG. 4) for March 3 to March 17, which is one week before and one week after the reference date, from the EPG information stored in the EPG information storage area, and reads the category dictionary table (FIG. 3) from the category dictionary storage area (step S201).

Next, the evaluation vector calculation unit 1 calculates an evaluation vector for each program based on the read EPG information and category dictionary table, and stores the calculated evaluation vectors to the evaluation vector storage area. Furthermore, the category determination unit 2 determines that each programs belongs to any one or more categories for which the program has an evaluation vector of, for instance, 0.05 or greater. The category determination unit 2 stores information regarding each program category (evaluation V) in association with the corresponding program in the program category information storage area (step S202).

Next, the preference vector determination unit 3 reads preferred programs broadcast from March 9 to March 3 (the programs for which the preferred program column shows "YES" in FIG. 4) from the preferred program storage area (step S203).

After step S203, the preference vector determination unit 3 normalizes the evaluation vectors of the preferred programs read at step S203 by tallying the evaluations vectors by category, here the evaluation vectors being those in the program category (evaluation V) column inside the frame 40 in FIG. 4. As a result, a preference vector "music 0.75, travel 0.25" is obtained (step S204).

At step S205, the preference applicability estimation unit 4 reads the evaluation vectors of programs broadcast from March 11 to March 17 from the program category storage area, and calculates the logical product of the evaluation vectors and the preference vector. Taking for example the case of 'Movie "ABCDE" Musical' broadcast on March 11, when the logical product of the evaluation vectors and the preference vectors is calculated, a vector value 0.5 is extracted for the category "music" that is the common element. Since there are no common elements between the vectors in the categories of "movie" and "travel", the vectors values are 0.0.

Next, the preference applicability estimation unit 4 tallies the values calculated at step S205 per program, to calculate a preference match degree for each program (step S206), setting programs for which the preference match degree is equal to or greater than a threshold value, e.g. 0.5, as recommended programs. These are the programs for which "YES" is shown in the recommended program column in the example in FIG. 4. The preference applicability estimation unit 4 then sends a recommended program list to the channel-by-channel statistic processing unit 402 (step S207:Y, step S208). Note that in the case of the aforementioned 'Movie "ABCDE" Musical', the preference match degree is 0.5, and therefore this program is set as a recommended program.

At step S103 in FIG. 17, the channel-by-channel statistic processing unit 402 receives information relating to one or more newly found channels in the EPG information from the program recommendation unit 300, and updates the channel information using the received information.

At step S104, the channel-by-channel statistic processing unit 402 reads the channel information table (FIG. 6) from the channel information storage unit 401, and based on the received recommend program list and the channel information table (FIG. 6), generates the channel-by-channel recommended program list (FIG. 7), and stores the generated channel-by-channel recommended program list to the channel-by-channel recommended program storage unit 403. The channel-by-channel statistic processing unit 402 then generates frequency distribution information (FIG. 8, FIG. 9), and sends the generated frequency distribution information to the channel suggestion unit 404.

After step S104, the channel suggestion unit 404 judges that, from among unsubscribed pay channels in the frequency distribution information for the week starting on March 11, the pay channel 201 which has a broadcast frequency exceeding the subscription reference frequency "3 programs per day" is a subscription suggested channel. The channel suggestion unit 404 also instructs the display control unit 405 to display a subscription suggestion screen (step S105, step S106:YES).

Figure 12:
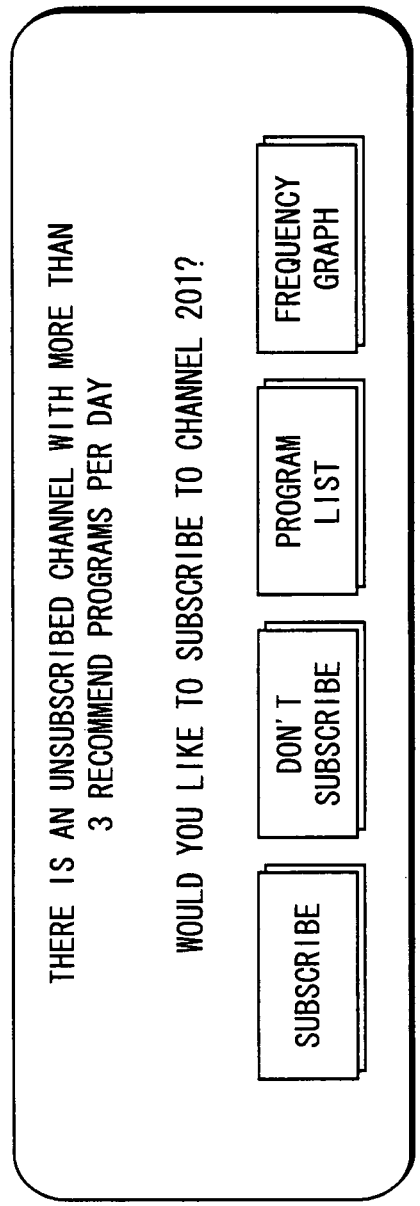
FIG. 12 is an example of a form for suggesting subscription.

Next, the display control unit 405 has the display unit 20 display the subscription suggestion form shown in FIG. 12, and the reception unit 500 receives a predetermined input operation performed by the user while looking at the subscription suggestion form (step S107).

Figure 14:
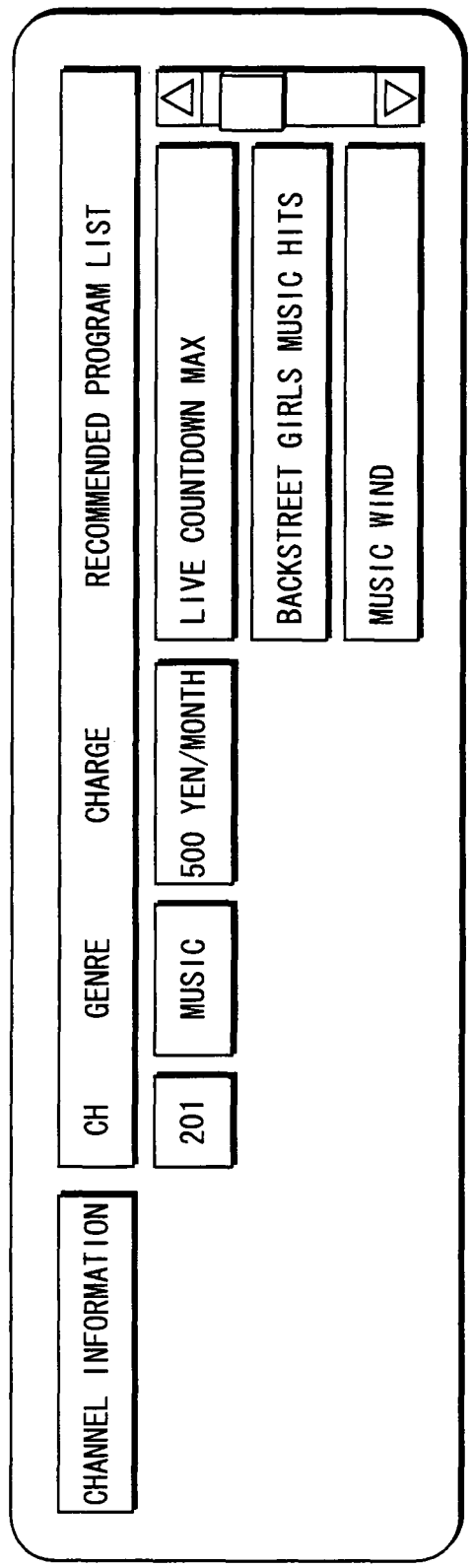
FIG. 14 is an example of display of a program list.

Upon receiving a selection from the program list from the user via the input receiving unit 500 at step S107, the display control unit 405 acquires EPG information relating to the programs broadcast by the subscription suggested channel from the channel-by-channel recommended program storage unit 403, and has the display unit 20 display a program list (FIG. 14) expressing the acquired information.

Figure 15:
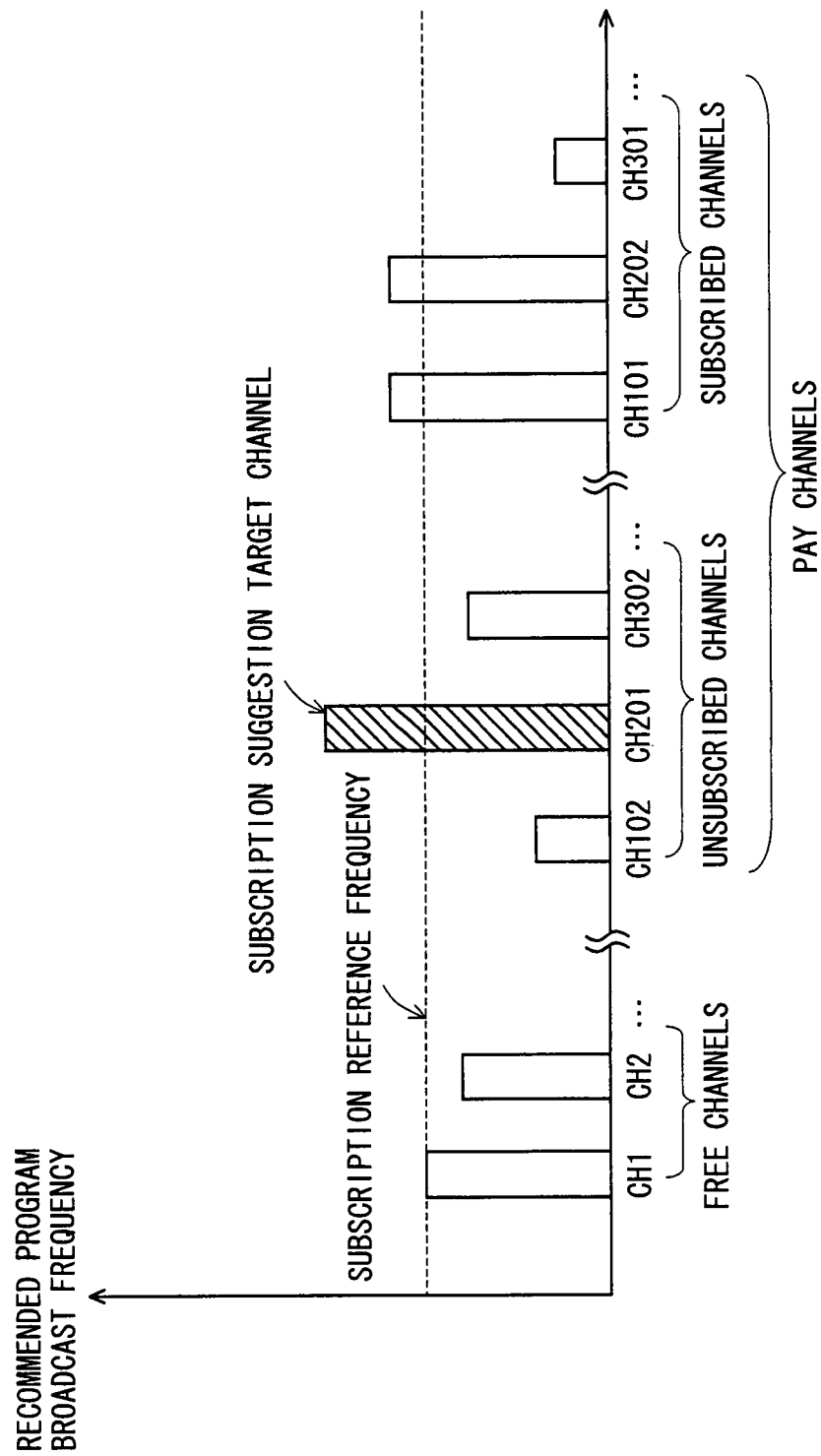
FIG. 15 is an example of display of a first frequency graph.

Upon receiving a selection of the frequency graph, the display control unit 405 acquires the frequency of recommended programs broadcast on a plurality of channels including the subscription suggested channel from the channel-by-channel recommended program storage unit 403, and displays a first frequency graph (FIG. 15) on the display unit 20 for comparison between channels of the acquired frequencies.

Figure 16:
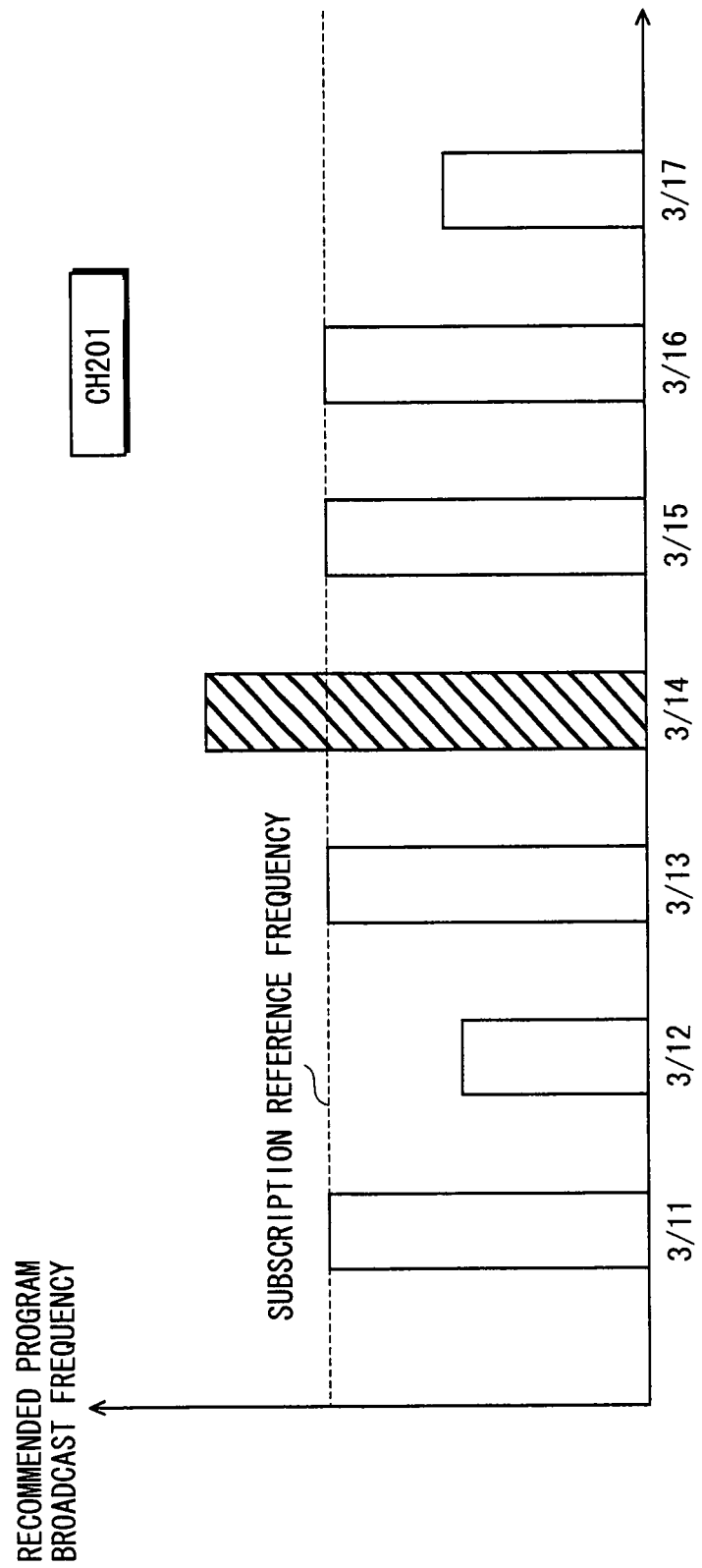
FIG. 16 is an example of display of a second frequency graph.

The display control unit 405 may further display a second frequency graph (FIG. 16) for comparing the frequencies of the recommended programs broadcast on the subscription suggested channel in a time series.

When an operation is received to subscribe to the subscription suggested channel 201 via the input receiving unit 500 at step S107, the channel suggestion unit 404 connects to the server of the broadcast communication enterprise that operates the channel 201, performs subscription processing for the channel, and updates the channel information table (FIG. 6) (step S111).

Note that in the same way as suggesting subscribing, in the case of suggesting canceling a channel, the cancellation suggestion form shown in FIG. 11 is displayed, a statistical processing result is displayed in accordance with a user operation, and cancellation processing is performed.

As had been described, the channel subscription suggestion apparatus of the first embodiment determines preference vector for a user according to a history of recording or viewing by the user, and suggests either subscribing to or canceling a subscription to a pay channel according to the how often recommended programs that are estimated to match the user's preferences are broadcast. Therefore, the channel subscription suggestion apparatus of the first embodiment can make suggestions that more accurately reflect the user's preferences than with conventional techniques.

Moreover, since it is unnecessary to calculate viewer ratings data for all users and perform cluster analysis in advance in this suggestion processing, the processing load is relatively small, and the channel subscription suggestion apparatus can, for instance, be implemented compactly inside various apparatuses for receiving broadcasts.

Furthermore, when making a suggestion, EPG information relating to recommended programs and graphs for comparison and temporal transition for channels of broadcast frequency of recommended programs are displayed, and therefore the user can take these into consideration when making judgments as to whether to subscribe to or to cancel a subscription.

In addition, using the EPG information, recommended programs that are expected to be broadcast in the future can be taken into consideration in the broadcast frequency. This means that, for instance, a suggestion can be made to subscribe to a channel that will commence broadcasting a new program meeting the user's preferences in the near future.

(Second Embodiment)

The channel subscription suggestion apparatus of the second embodiment differs from the channel suggestion apparatus of the first embodiment in that it makes individual suggestions regarding subscribing to and canceling of subscriptions to the channels with respect to a plurality of users, and that it tallies the individual suggestions to make overall suggestions.

Figure 21:
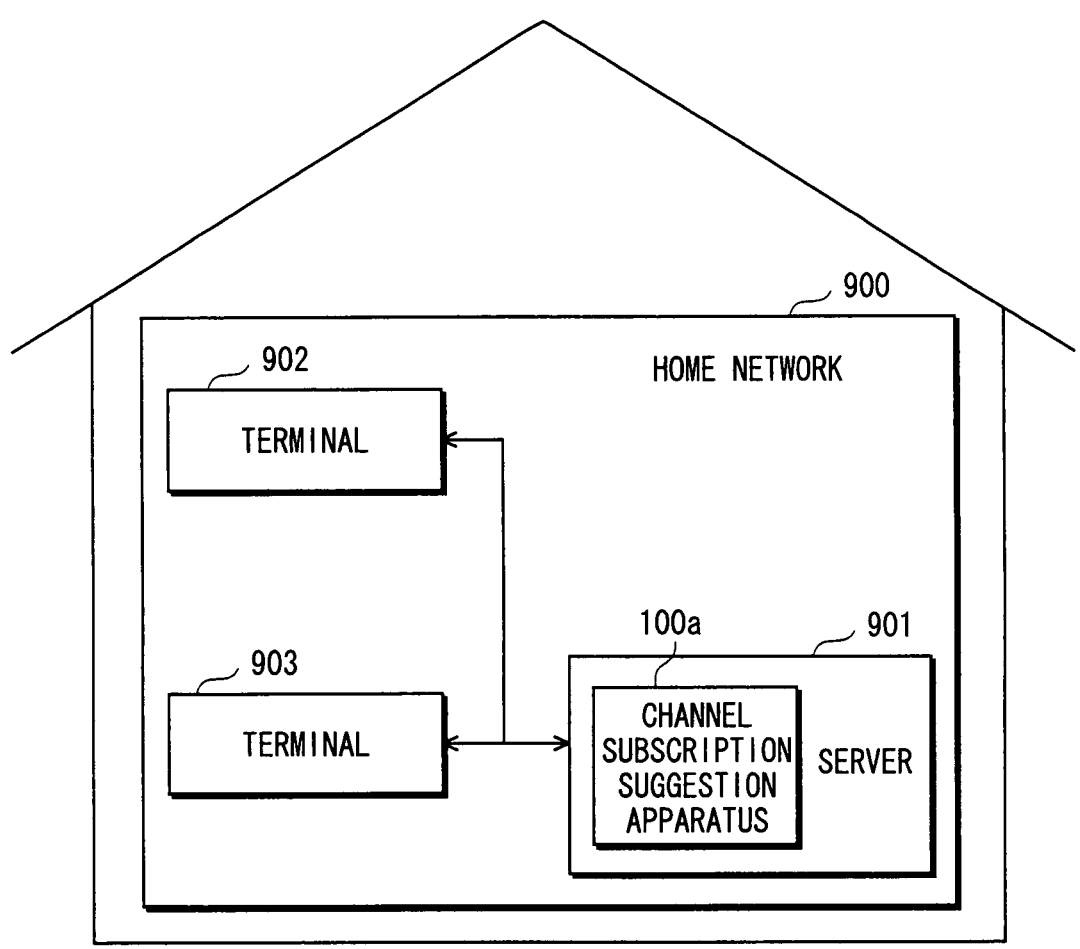

FIG. 21 is a structural drawing of a home network that includes a channel subscription suggestion apparatus 100a of the present embodiment.

As shown in FIG. 18, connected to a home network 900 are a server 901, and terminals 902 and 903. The channel subscription suggestion apparatus 100a is built in to the server 901.

In addition to receiving broadcast signals, the server 901 distributes, from among the programs included in the broadcast signals, programs requested by the terminals 902 and 903 to the terminals 902 and 903. The programs are distributed to the terminals 902 and 903 via, for instance, a wired LAN or a wireless LAN. The terminals 902 and 903 play back the programs distributed from the server 901.

Here, the terminals 902 and 903 may be each be used by a different member of a family. In this case, the channel subscription suggestion apparatus 10a acknowledges each program either of the terminals 902 and 903 makes requests for to the server 901 as a preferred program of the family member corresponding to the terminal that made the request for the program.

When a particular terminal is shared by a plurality of family members, a program requested by the terminal can be acknowledged by the channel subscription suggestion apparatus 100a as a preferred program of a particular family member if information identifying the family member is attached to the request.

By distinguishing between preferences of each family member in this way, the channel suggestion subscription apparatus 100a gives suggestions with respect to each family member based on the individual preferences in the same way as in the first embodiment.

The following describes the overall suggestion processing by the channel subscription suggestion apparatus 100a using a specific example.

As one example, the following subscription suggested channels are shown according to individual suggestions with respect to the family members.

| Father | CH101 | CH102 | CH103 |
|---|---|---|---|
| Mother | CH201 | CH202 | CH103 |
| Son | CH103 | CH301 | CH302 |
| Daughter | CH302 | CH201 | CH202 |

Here, for each family member, the subscription suggested channels are shown in order according to the number of recommended programs, with the total number of different subscription suggested channels being seven.

The channel subscription suggestion apparatus 100a selects one subscription suggested channel per member that includes the greatest number of recommended programs from among all the subscription suggested channels, and makes an overall recommendation of the subscription suggested channels selected per user.

In the above example, an overall recommendation is made for subscription suggested channels CH101, CH201, CH103 and CH302.

The channel subscription suggestion apparatus 100a may make an overall recommendation of subscription suggested channels by selecting, from among all the subscription suggested channels, predetermined subscription suggested channels in accordance with the number of family members for which individual suggestions have been made.

If, for instance, subscription suggested channels are selected that have been individually suggested with respect to two or more people, the channels suggested overall are CH103, CH302, CH201 and CH202. If two subscription suggested channels are selected that have been individually suggested to the most number of family members, the channels suggested overall are CH103 and CH302.

These overall suggestions are useful for determining whether to subscribe to or cancel a subscription to a pay channel because they help to convince the whole family of the decision, especially, for instance, in a case when the number of channels that can be subscribed to is limited to due to budgeting concerns.

Furthermore, the channel subscription suggestion apparatus 100a may make overall suggestions by tallying individual suggestions made using subscription frequency levels and cancellation frequency levels for individual users.

It is preferable that the individual subscription frequency levels and cancellation frequency levels are set to relatively small values such that the more a particular family member watches television, the easier it is to suggest subscribing to channels and the more difficult it is to suggest canceling channels.

Setting the subscription frequency levels and cancellation frequency levels increases the number of channels being individually suggested to a family member or members who watch television frequently, and as a result means that the preferences of that family member or members are reflected more strongly than the preferences of other members.

This kind of overall suggestions enable all members of the family to make decisions regarding subscription to and cancellation of subscriptions to channels in a manner that is fair to all members of the family.

Another possible way of making individual suggestions is to take into consideration what time of the day family members watch television. For instance, for a mother who usually watches television during the day, individual recommendations may be made with priority given to channels having more recommended programs during the day. For a father who watches television in the evening after coming home, individual recommendations may be made with priority given to channels having more recommended programs during the evening rather than during the day.

When a selection is made to subscribe to a new pay channel in response to a subscription suggestion, the decision maker in the family may be notified of this by email. This makes managing channel subscriptions more convenient for the decision maker.

<Modification Example>

The first embodiment describes a case of suggesting subscribing to a channel when the broadcast frequency of recommended programs for an unsubscribed pay channel exceeds a predetermined reference frequency. However, suggestions regarding channels may be made in accordance with the preference match degree.

For instance, the user may select in advance a level of a user preference value as a suggestion condition, and set any channel whose preference match degree corresponds to the level as a subscription suggested channel.

FIG. 19A shows an example of the structure and contents of a preference match degree level table.

The preference match degree level table 20 stores preference match degrees 21 and preference levels 22 in correspondence, and is stored in the threshold value storage unit 406.

As one example, a preference level "4" is selected in advance by the user as a subscription suggestion condition, and stored in the threshold value storage unit 406.

FIG. 19B shows an example of a channel-by-channel match degree list.

The channel-by-channel match degree list 30 stores channels 31 and match degrees 32 in correspondence. The channels are arranged by the channel-by-channel statistic processing unit 402 in descending order of preference match degree based on the preference match degrees of recommended programs determined by the preference applicability estimation unit 4.

The following describes operations of the present modification example that differ from the operational flow of the first embodiment.

The channel subscription suggestion apparatus 100 performs step S101 to step S103 in FIG. 17.

The channel-by-channel statistic processing unit 402 receives the recommended program list and information expressing the preference match degrees of each recommended program, from the program recommendation unit 300, generates the channel-by-channel match degree list 30, and sends the generated channel-by-channel match degree list 30 to the channel suggestion unit 404.

The channel suggestion unit 404 reads the preference levels from the threshold value storage unit 406, and reads the channel information table from the channel information storage unit 401.

The channel suggestion unit 404 receives the channel-by-channel match degree list 30 from the channel-by-channel statistic processing unit 402, and specifies any channels whose match degree corresponds to the preference level "4".

In the present modification example only the unsubscribed pay channel 102 whose match degree is 0.95 is specified as a subscription suggested channel.

The channel suggestion unit 404 performs the processing from step S107 onwards in FIG. 17 for the specified subscription suggested channel.

Note that although in the described modification example a channel or channels having a preference level that is equal to or greater than a predetermined level are suggested, a combination of broadcast frequency and preference match degree level of a recommended program may be used to specify a channel or channels.

<Supplementary Remarks>

Although the present invention has been described based on preferred embodiments, the present invention is by no means limited to the described preferred embodiments. Cases such as the following are included in the present invention.

(1) Although a description has been given of the preference vector being determined based on history information concerning programs that have been recorded or viewed, input of preferred programs, preferred genres, or the like, may be received from the user.

This enables programs meeting the user's preferences to be recommended even if the history information concerning recording and the like is insufficient.

(2) When a channel suggested according to the subscription suggestion form is a program that has already been recommend in the past but was not subscribed to, notification that subscribing to that channel has been suggested in the past may be displayed.

As one example, in the case of displaying information showing how many times a channel has been suggested in the past in the subscription suggestion form, the channel suggestion unit 404 stores suggestion history information in a memory or the like. The suggestion information shows channel suggestion history and suggestion results. When suggesting a channel, a suggestion count showing how many times the channel being suggested has been suggested is tallied from the suggestion history information, and the result obtained by tallying is displayed in the subscription suggestion form.

Furthermore, the channel suggestion unit 404 may change the reference frequency in accordance with the suggestion count. If, for instance, the reference frequency is increased in accordance with the number of times the user did not respond to a suggestion, this structure prevents a same channel that the user did not subscribe to from being suggested to the user numerous times.

(3) Although a description was given in the preferred embodiments of channel subscription suggestions being given for channels that meet a condition of the recommended programs exceeding a predetermined frequency, further conditions set by the user in advance may be added. Such conditions may include restrictions regarding the number of pay channels that can be subscribed to, or charges according to the limitation for channels subscribed to.

For instance, when recommending channel subscription, the channel suggestion unit 404 judges whether the restrictions are exceeded, and if the restrictions are exceeded, the display control unit 405 has the display unit 20 display, in the subscription suggestion form, notification to the extent that the restrictions are exceeded.

Furthermore, when displaying the subscription suggestion form, the remaining number of subscriptions and/or charges according to the limitation may be displayed. Alternatively, it is possible to not recommended subscription if the restrictions will be exceeded.

(4) Furthermore, the recommended program list may be displayed in the form of an electronic program table that expresses recommended programs and subscription/cancellation recommended channels in a visually recognizable manner.

FIG. 20 shows an example of the electronic program table.

The electronic program table 10 is generated based on EPG information and the channel-by-channel recommended program list (FIG. 7), and uses different background colors, for instance, in channel program frames so as to distinguish between subscribed and unsubscribed pay channels, and so as to distinguish between channels for which subscription or cancellation is recommended.

In addition, display may be performed in a manner that enables recommended programs to be distinguished from other programs, such as displaying the recommended programs in an accentuated manner.

In FIG. 20, the pay channel 201 is a subscription suggested channel, and channels 101 and 103 are already subscribed channels. The programs shown by rectangles 11 to 15 in FIG. 20 are recommended programs.

For instance, when the subscription reference frequency for the broadcast frequency of recommended programs is two programs per day, the user is able to recognize at a glance by referring to the electronic programmable in FIG. 20 that channel 201 is being suggested because it broadcasts three recommended programs.

Furthermore, pay channels may be displayed differently according to a difference between the recommended program broadcast frequency and the reference frequency. In particular, recommended programs in subscribed channels and subscription suggested channels may be displayed in a manner that distinguishes them from other recommended programs.

Figure 13:
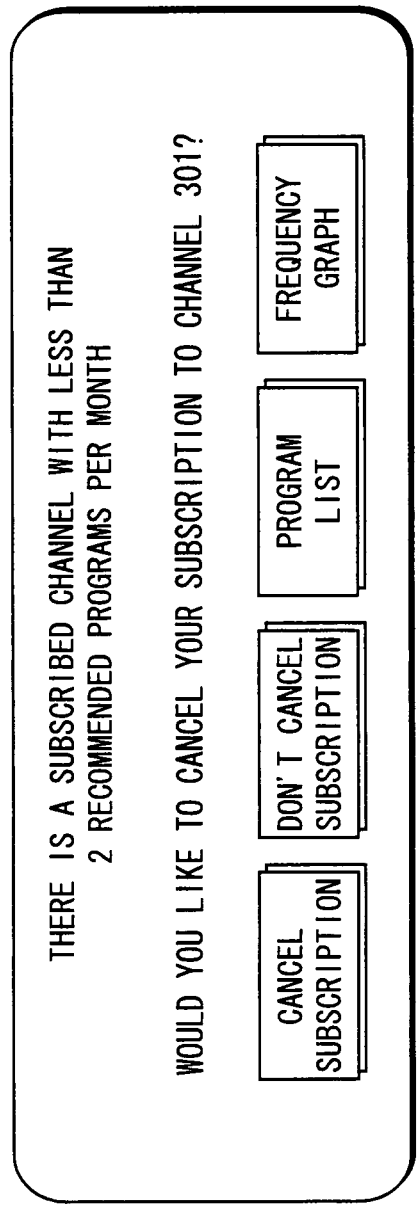
FIG. 13 is an example of a form for suggesting cancellation of a subscription.

Furthermore, instead of displaying the suggestion forms shown in FIG. 12 and FIG. 13, suggestions for subscription to/cancellation of pay channels may be made by displaying the electronic program table.

(5) Furthermore, in the second embodiment, when a same recommended program is recommended for more than one family member, this may be specified as a recommended program for a plurality of family members, or priority may be given to the preferences of the family member who watches television most in the family, and the recommended program may be specified as a recommended program for that family member. Note that subscriptions to pay channels are not limited to being made by family units, and any group that can make a subscription is possible.

(6) Conditions for calculating preference match degrees may include whether or not a channel frequently broadcasts dubbed programs, whether or not a channel frequently broadcasts high vision programs, or whether or not a channel is a digital broadcast channel.

(7) Although suggestions are made regarding subscriptions to pay channels in the preferred embodiments, suggestions may be made regarding free channels if a subscription is required to view the channel.

(8) In the preferred embodiments, preference vectors are found by normalizing contribution values tallied per category, and preference match degrees are calculated by weighting by calculating the logical product of the evaluation vectors and the preference vector. However, other methods may be used to find the preference vector and the preference match degrees. One example is finding a preference vector by calculating a ratio of contribution values per category or the number of preferred programs per category. Another example is finding preference match degrees by weighting by multiplying preference vectors with the evaluation vectors of each program.

(9) The present invention may be implemented as an LSI that makes suggestions regarding channel subscription. This LSI can be realized by integrating part or all of the function blocks included in the channel subscription suggestion apparatus 100 shown in FIG. 1. Each of the function blocks may be realized by an individual chip, or part or all of the function blocks may be realized by a single chip.

Although the integrated circuit that makes suggestions regarding channel subscription is described above as being an LSI, the integrated circuit may by an IC, a system LSI, a super LSI, or an ultra LSI, depending on the degree of integration.

Furthermore, the means to achieve the integrated circuit is not limited to LSI, but may be a purpose-specific processor or a general-purpose processor. The integration may be realized with use of a FPGA (field programmable gate array) that is programmable after manufacturing of the LSI, or a re-configurable processor that enables re-configuration of the connection and settings of circuit cells in the LSI.

Furthermore, if technology for an integrated circuit that replaces LSIs appears due to advances in or derivations from semiconductor technology, that technology may be used for integration of the functional blocks. Bio-technology is one possible application.

(10) The present invention may be methods shown by the above. Furthermore, the methods may be a computer program realized by a computer, and may be a digital signal of the computer program.

Furthermore, the present invention may be a computer-readable recording medium such as a flexible disk, a hard disk, a CD-ROM, an MO, a DVD, a DVD-ROM, a DVD-RAM, a BD (Blu-ray Disc) or a semiconductor memory, that stores the computer program or the digital signal.

Furthermore, the present invention may be the computer program or the digital signal transmitted on a electric communication network, a wireless or wired communication network, a network of which the Internet is representative, or a data broadcast.

Furthermore, the present invention may be a computer system that includes a microprocessor and a memory, the memory storing the computer program, and the microprocessor operating according to the computer program.

Furthermore, by transferring the program or the digital signal to the recording medium, or by transferring the program or the digital signal via a network or the like, the program or the digital signal may be executed by another independent computer system.

Industrial Applicability

The channel subscription suggestion apparatus of the present invention can be used, for instance, in a set top box for receiving broadcasts of multiple pay channels.

The invention claimed is:

1. A channel subscription suggestion apparatus that gives suggestions regarding a subscription to a subscription channel whose broadcast programs are permitted to be viewed by subscription, comprising:
   a reception unit operable to receive program guide information relating to a plurality of programs broadcast on a plurality of channels, the program guide information showing a broadcast time of each program;
   an acquisition unit operable to acquire preference information showing a preference of one user with respect to programs;
   a determination unit operable to estimate, with reference to the program guide information and the preference information, whether each respective program meets the preference of the one user, and determine that each of one or more programs estimated to meet the preference is a recommended program;
   a count unit operable to count a total number of recommended programs specified by the program guide information; and
   a subscription suggestion unit operable to suggest subscribing to, or canceling a subscription to, at least one subscription channel, in accordance with a frequency that the recommended programs are broadcast on the subscription channel, the frequency being a ratio between the total number of the recommended programs counted by the count unit and a total number of all programs broadcast on the subscription channel during a predetermined period in which two or more programs are broadcast.

2. The channel subscription suggestion apparatus of claim 1, wherein
   the determination unit evaluates, for each program, a match degree that shows a match degree between the preference of the user and the program, and uses the determined match degree to estimate whether or not the program meets the preference of the user, and the subscription suggestion unit makes the suggestion in accordance with the match degrees in addition to the broadcast frequencies.

3. The channel subscription suggestion apparatus of claim 1, wherein the acquisition unit includes:

a restriction information acquisition sub-unit operable to acquire restriction information showing a subscription charge upper limit for subscription channels, and the subscription suggestion unit includes:

a notification sub-unit operable to store subscription information showing a charge for each of one or more subscribed subscription channels, and when the subscription suggestion unit makes a suggestion to subscribe to a subscription channel, if a total of the one or more charges shown by the subscription information exceeds the restriction charge upper limit, notify the user that the restriction charge upper limit is exceeded.

4. The channel subscription suggestion apparatus of claim 1, wherein the acquisition unit acquires history information relating to a history of program recording or program viewing by the user, and acquires the preference information from the history information.

5. The channel subscription suggestion apparatus of claim 4, wherein the program guide information includes, for each program, at least one keyword relating to content of the program, and the channel subscription suggestion apparatus further comprises:

a category dictionary storage unit operable to store a plurality of contribution degrees, each showing to what extent a different one of a plurality of specific keywords contributes to a different one of a plurality of categories;

an evaluation vector calculation unit operable to calculate an evaluation vector whose elements are values obtained by tallying, per category, the contribution values corresponding to the specific keywords included for each program in the program guide information; and a category determination unit operable to judge, with respect to each program, which one or more categories the program belongs to, based on the evaluation vectors calculated with respect to the program, the acquisition unit includes:

a history information acquisition sub-unit operable to acquire the history information; and a preference vector determination sub-unit operable to tally, per category, the evaluation vectors of categories to which the programs included in the history information belong, in order to determine a preference vector that has elements each of which is a value showing a strength of a preference of the user in a different one of the categories, the determination unit includes:

a preference applicability estimation sub-unit operable to, with respect to each program included in the program guide information, (i) evaluate, as a preference degree, a value obtained by using the preference vector to weight the evaluation vector calculated for the program, and (ii) compare the evaluated preference degree with a threshold value to estimate whether or not the program meets the preference of the user, and the determination unit determines that any one or more programs estimated by the preference applicability estimation sub-unit to meet the preference of the user are recommended programs.

6. The channel subscription suggestion apparatus of claim 1, further comprising:

a program display unit operable to display an electronic program table based on the program guide information, wherein the subscription suggestion unit makes the suggestion by causing the program display unit to display in a manner that, among the one or more recommended programs included in the electronic program table, any recommended program broadcast on a channel to which a subscription is suggested is distinguishable from other programs, and causing the program display unit to display in a manner that one or more channels to which a subscription is suggested are distinguishable from other channels.

7. The channel subscription suggestion apparatus of claim 1, wherein the subscription suggestion unit, when making the suggestion, presents to the user at least one of (a) program guide information relating to the one or more recommended program, (b) a temporal transition of the broadcast frequency of the one or more recommended programs, and (c) the broadcast frequency of the one or more recommended programs on a plurality of channels that include the subscription channels.

8. The channel subscription suggestion apparatus of claim 1, wherein the acquisition unit acquires preference information of a plurality of users, the determination unit determines one or more recommended program respectively for each user, using the preference information of the respective user, and the subscription suggestion unit specifies, for each user, one or more subscription channels to suggest to the user in accordance with the broadcast frequency of the one or more recommended programs for the user, determines a subscription channel, from among the specified subscription channels, to suggest commonly to all users, based on how many users the suggestion is to be made to, and suggests subscribing to or canceling a subscription to the determined subscription channel.

9. The channel subscription suggestion apparatus of claim 8, wherein the acquisition unit acquires history information relating to program recording or program viewing by the one user, and acquires the preference information from the history information, and the subscription suggestion unit sets, with respect to each user, a threshold value such that the more programs that are included in the history information, the more likely subscribing is to be suggested and the less likely canceling is to be suggested, and for each user, compares the threshold value set with respect to said user with each broadcast frequency, in order to specify the one or more subscription channels to be suggested to said user.

10. A channel subscription suggestion method that gives suggestions regarding a subscription to a subscription channel whose broadcast programs are permitted to be viewed by subscription, comprising:

a reception step of receiving program guide information relating to a plurality of programs broadcast on a plurality of channels, the program guide information showing a broadcast time of each program;

an acquisition step of acquiring preference information showing a preference of one user with respect to programs;

a determination step of estimating, with reference to the program guide information and the preference information, whether each respective program meets the preference of the one user, and determining that each of one or more programs estimated to meet the preference is a recommended program;

a count step of counting a total number of recommended programs specified by the program guide information; and a subscription suggestion step of suggesting subscribing to, or canceling a subscription to, at least one subscription channel, in accordance with a frequency that the recommended programs are broadcast on the subscription channel, the frequency being a ratio between the total number of the recommended programs counted in the count step and a total number of all programs broadcast on the subscription channel during a predetermined period in which two or more programs are broadcast.

11. The channel subscription suggestion method of claim 10, wherein the acquisition step acquires preference information of a plurality of users, the determination step determines one or more recommended program respectively for each user, using the preference information of the respective user, and the subscription suggestion step specifies, for each user, one or more subscription channels to suggest to the user in accordance with the broadcast frequency of the one or more recommended programs for the user, determines a subscription channel, from among the specified subscription channels, to suggest commonly to all users, based on how many users the suggestion is to be made to, and suggests subscribing to or canceling a subscription to the determined subscription channel.

12. A control program embodied on a non-transitory computer-readable medium, the program causing a computer to execute a channel subscription suggestion method that gives suggestions regarding a subscription to a subscription channel whose broadcast programs are permitted to be viewed by subscription, the method comprising:

a reception step of receiving program guide information relating to a plurality of programs broadcast on a plurality of channels, the program guide information showing a broadcast time of each program;

an acquisition step of acquiring preference information showing a preference of one user with respect to programs;

a determination step of estimating, with reference to the program guide information and the preference information, whether each respective program meets the preference of the one user, and determining that each of one or more programs estimated to meet the preference is a recommended program;

a count step of counting a total number of recommended programs specified by the program guide information; and a subscription suggestion step of suggesting subscribing to, or canceling a subscription to, at least one subscription channel, in accordance with a frequency that the recommended programs are broadcast on the subscription channel, the frequency being a ratio between the total number of the recommended programs counted in the count step and a total number of all programs broadcast on the subscription channel during a predetermined period in which two or more programs are broadcast.

13. An integrated circuit in a channel subscription suggestion apparatus that gives suggestions regarding a subscription to a subscription channel whose broadcast programs are permitted to be viewed by subscription, the integrated circuit comprising:

a reception unit operable to receive program guide information relating to a plurality of programs broadcast on a plurality of channels, the program guide information showing a broadcast time of each program;

an acquisition unit operable to acquire preference information showing a preference of one user with respect to programs;

a determination unit operable to estimate, with reference to the program guide information and the preference information, whether each respective program meets the preference of the one user, and determine that each of one or more programs estimated to meet the preference is a recommended program;

a count unit operable to count a total number of recommended programs specified by the program guide information; and a subscription suggestion unit operable to suggest subscribing to, or canceling a subscription to, at least one subscription channel, in accordance with a frequency that the recommended programs are broadcast on the subscription channel, the frequency being a ratio between the total number of the recommended programs counted by the count unit and a total number of all programs broadcast on the subscription channel during a predetermined period in which two or more programs are broadcast.

* * * * *